United States Patent
Mensa et al.

(10) Patent No.: US 10,781,939 B2
(45) Date of Patent: Sep. 22, 2020

(54) DEVICE FOR CONTROLLING A GASEOUS FLOW AND SYSTEMS AND METHODS EMPLOYING THE DEVICE

(71) Applicant: Nanotech Analysis S.R.L., Turin (IT)

(72) Inventors: Gianpiero Mensa, Turin (IT); Raffaele Correale, Turin (IT)

(73) Assignee: Nanotech Analysis S.R.L., Turin (IT)

( * ) Notice: Subject to any disclaimer, the term of this patent is extended or adjusted under 35 U.S.C. 154(b) by 341 days.

(21) Appl. No.: 15/322,791

(22) PCT Filed: Jul. 2, 2015

(86) PCT No.: PCT/IB2015/054991
§ 371 (c)(1),
(2) Date: Dec. 29, 2016

(87) PCT Pub. No.: WO2016/005863
PCT Pub. Date: Jan. 14, 2016

(65) Prior Publication Data
US 2017/0130870 A1    May 11, 2017

(30) Foreign Application Priority Data
Jul. 7, 2014  (IT) .......................... MI2014A001227

(51) Int. Cl.
*F16K 99/00* (2006.01)
*G01N 1/22* (2006.01)

(52) U.S. Cl.
CPC ...... *F16K 99/0005* (2013.01); *F16K 99/0007* (2013.01); *F16K 99/0028* (2013.01);
(Continued)

(58) Field of Classification Search
CPC ............. F16K 99/0003; F16K 99/0005; F16K 99/0007; F16K 99/0009; F16K 99/0042; Y10T 137/87314; Y10T 137/87772
See application file for complete search history.

(56) References Cited

U.S. PATENT DOCUMENTS 5,964,242 A    10/1999  Slocum
6,929,030 B2 *  8/2005  Unger ............... B01L 3/502707
                                                    137/883
(Continued)

FOREIGN PATENT DOCUMENTS

CN    101109470 A    1/2008
EP    2273530 A1    12/2011
(Continued)

OTHER PUBLICATIONS

International Search Report for PCT/IB2015/054991, dated Oct. 20, 2015.
(Continued)

*Primary Examiner* — Robert K Arundale
(74) *Attorney, Agent, or Firm* — Arent Fox LLP; Michael Fainberg

(57) ABSTRACT

Disclosed are devices, systems and methods for gas sampling, for controlling and measuring a gaseous flow, and for controlling a pressure gradient. An exemplary device 1 for controlling a gaseous flow comprises a gaseous flow adjusting interface 2, configured to inhibit or allow a flow of gas through the device 1 in a controlled manner, and control means 3, 4 of the adjusting interface. The adjusting interface 2 comprises a plurality of nano-holes 20. Each of the nano-holes has sub-micrometric dimensions and is suitable to be opened or closed in a controlled manner. The control means 3,4, in turn, comprise actuating means 3, suitable to open or close these nano-holes, and electronic processing means 4, configured to activate the actuation means to open or close individually or collectively the nano-holes 20 in a controlled manner.

16 Claims, 17 Drawing Sheets

(52) U.S. Cl.
CPC ...... *F16K 99/0042* (2013.01); *F16K 99/0046* (2013.01); *G01N 1/22* (2013.01); *F16K 2099/0084* (2013.01)

(56) References Cited

U.S. PATENT DOCUMENTS

| | | | |
|---|---|---|---|
| 8,480,053 B2 * | 7/2013 | Heath | B01L 3/502738 216/2 |
| 2004/0222395 A1 * | 11/2004 | Yee | F16K 31/0655 251/65 |
| 2007/0051412 A1 | 3/2007 | Heath et al. | |
| 2009/0137874 A1 | 5/2009 | Cheng et al. | |
| 2012/0067433 A1 * | 3/2012 | Friedrich | B01L 3/502738 137/14 |
| 2015/0251179 A1 * | 9/2015 | Asai | B01L 3/50273 422/505 |
| 2017/0130870 A1 * | 5/2017 | Mensa | F16K 99/0005 |
| 2017/0140894 A1 * | 5/2017 | Mensa | F16K 99/0005 |

FOREIGN PATENT DOCUMENTS

| | | |
|---|---|---|
| GB | 2411046 A | 8/2005 |
| JP | H08-078340 A | 3/1996 |
| JP | 2001-272127 A | 10/2001 |
| JP | 2002036196 A | 2/2002 |
| WO | 2004010474 A1 | 1/2004 |
| WO | 2005/124797 A2 | 12/2005 |
| WO | 2006/104639 A2 | 10/2006 |
| WO | 2006104639 A1 | 10/2006 |
| WO | 2013/053039 A1 | 4/2013 |

OTHER PUBLICATIONS

Yanagisawa et al. "Magnetic Micro-Actuator" Proceedings of the Workshop on Micro Electro Mechanical Systems. Jan. 30-Feb. 2, 1991. pp. 120-124.

* cited by examiner

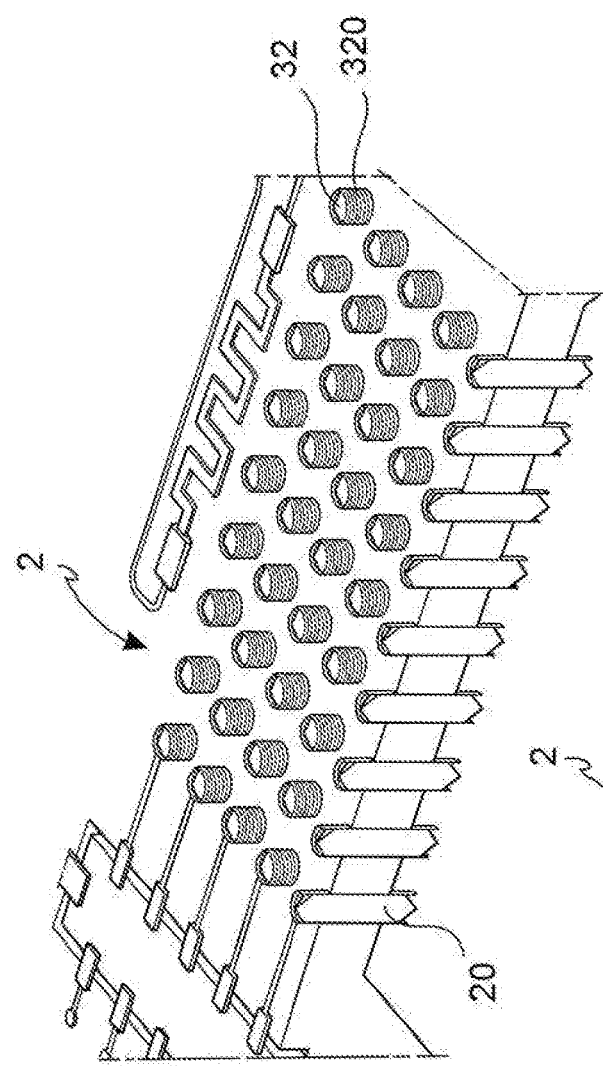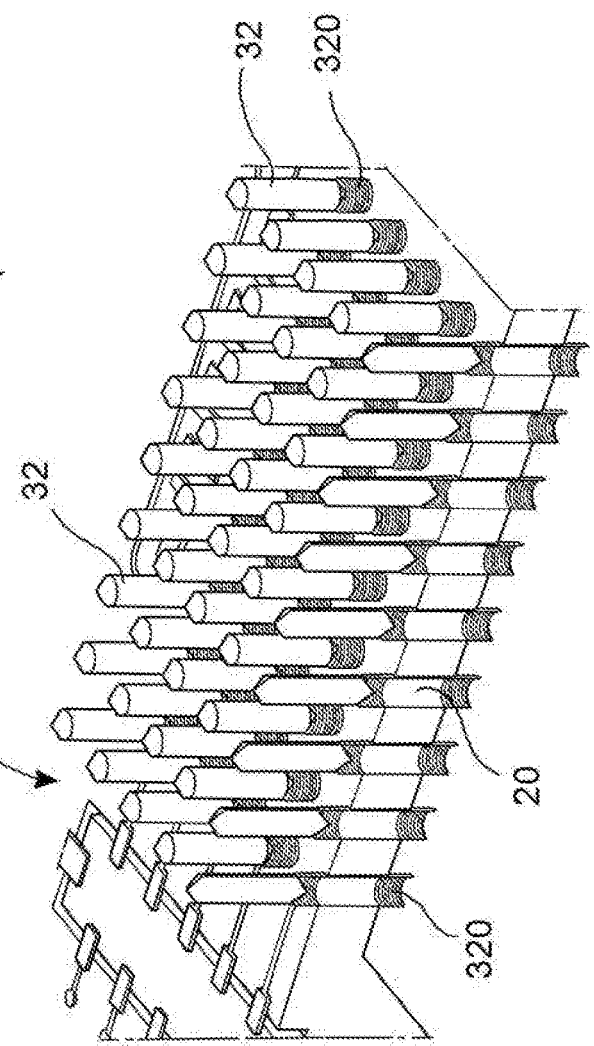

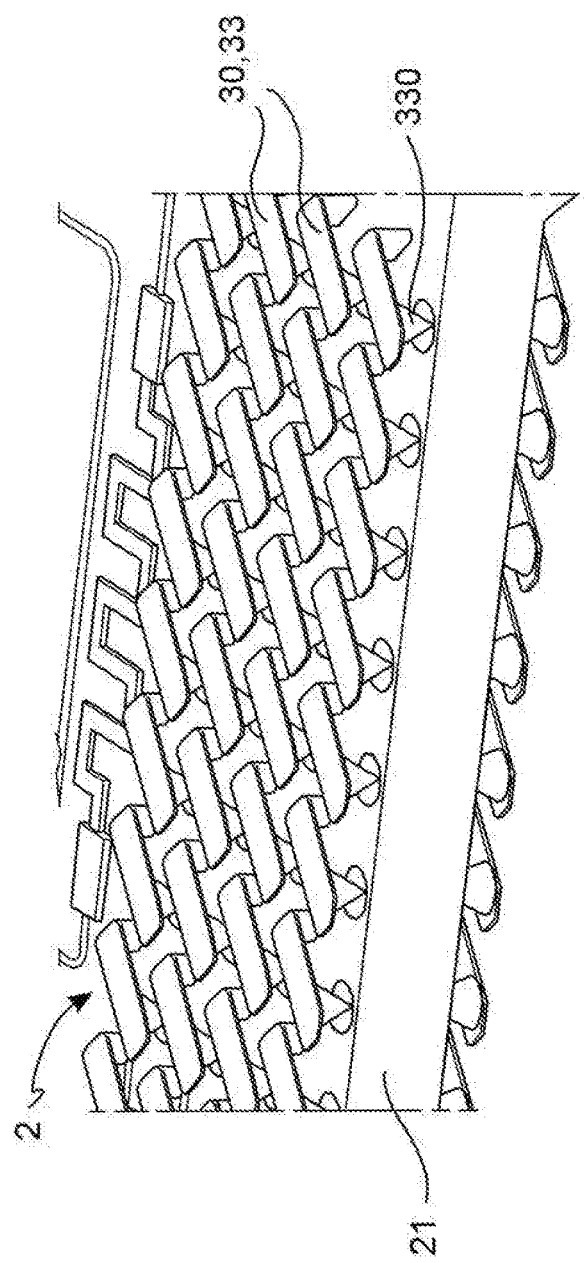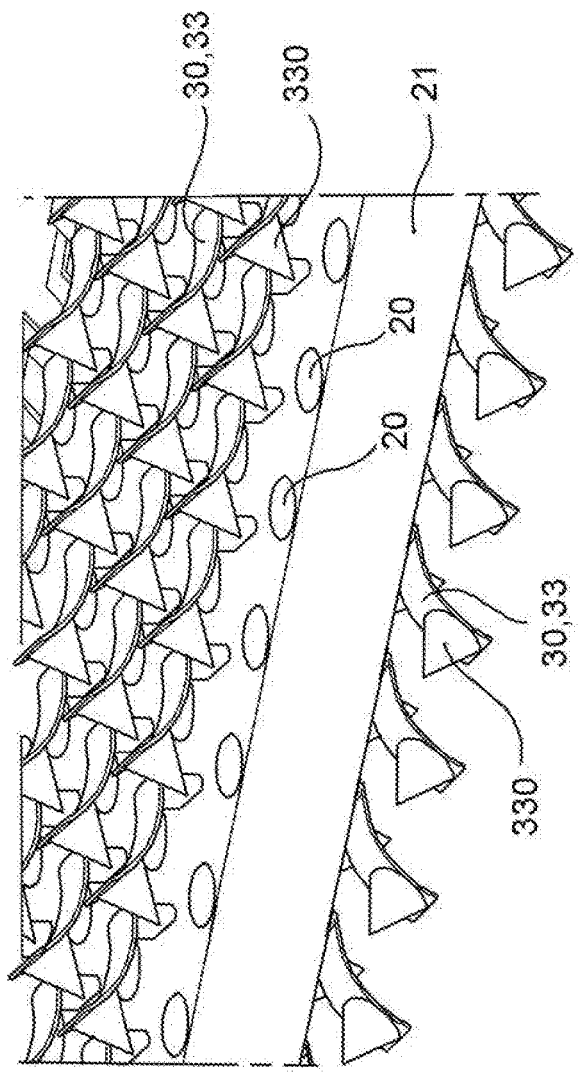

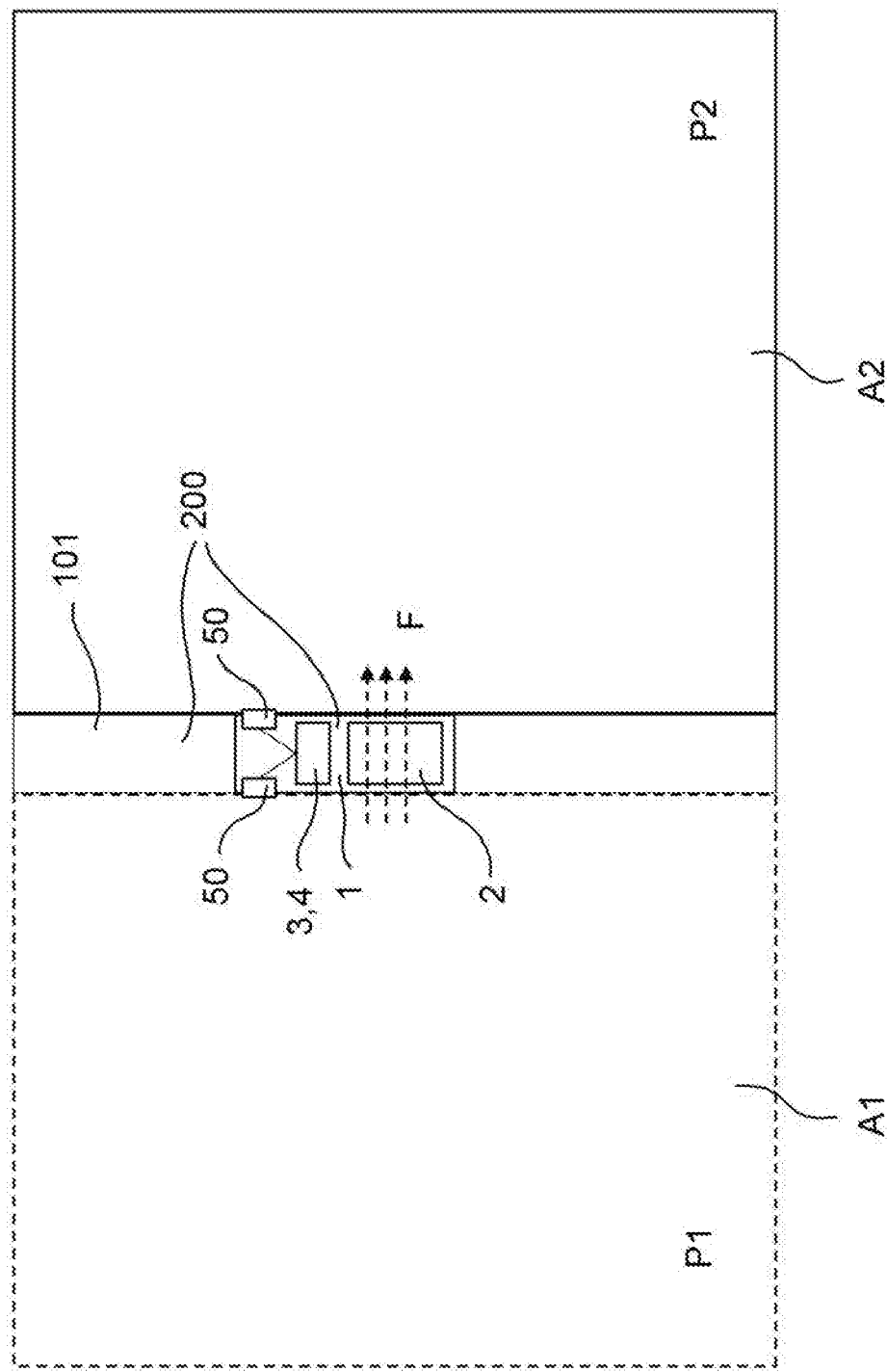

DEVICE FOR CONTROLLING A GASEOUS FLOW AND SYSTEMS AND METHODS EMPLOYING THE DEVICE

CROSS-REFERENCE TO RELATED APPLICATIONS

This application is a National Stage entry of International Application No. PCT/IB2015/054991 filed on Jul. 2, 2015, which claims priority to Italian Patent Application No. MI2014A001227 filed on Jul. 2, 2014. The disclosures of the prior applications are hereby incorporated in their entirety by reference.

TECHNOLOGICAL BACKGROUND OF THE INVENTION

Field of Application

This invention relates to the field of devices and methods for controlling a gaseous flow, in particular devices and methods capable of controlling micro-flows of gas.

The invention also relates to systems and methods for controlling a gaseous flow in a plurality of applications, such as flow control and measurement with a high accuracy and resolution, management of pressure gradients and/or gas sampling.

Description of the Prior Art

Numerous gaseous flow control devices are known. In a broad sense, all valve systems may refer to this category.

In this context, miniaturized valve systems are also know, such as, for example, micro-valves with even very small opening, having dimensions of the order of millimetres.

However, the known valve systems, even those miniaturized, if used under conditions of pressure other than vacuum pressures, allow a control of flows that, although small, are still in the viscous regime. This also entails that, in these known systems, the resolution and precision of flow control and/or measurement is limited to a granularity of minimum manageable flows that are viscous flows.

The terminology "flow in viscous regime," according to a commonly used nomenclature, here refers to a gaseous flow in which the mean free path ($\lambda$) of a particle is much smaller than the size D of the channel or container in which it is located, due to which there are continuous collisions and a continuous transfer of momentum and energy between particles.

On the contrary, the terminology "flow in molecular regime," according to a commonly used nomenclature, here means a gaseous flow in which the mean free path A of a particle is comparable or larger than the dimensions of the channel or container in which it is located, due to which the path of each particle is nearly free and independent with respect to that of the other particles.

Some theoretical definitions sometimes provide an intermediate regime (or "transition flow").

All commonly accepted definitions, regarding the classification of flows, agree in defining as "viscous regime flow" a flow in which the parameter $D/\lambda$ is greater than 100, while a "molecular regime flow" is a flow in which the parameter $D/\lambda$ is comparable to, or less than, 1. A "predominantly molecular regime flow" is defined as a flow in which the parameter $D/\lambda$ is of the order of magnitude of a few units, up to 10: in fact, in such conditions, although collisions between particles are not, strictly speaking, reduced to zero, most of the particles are in molecular regime conditions for most of the time.

The book "Vacuum Technology" by A. Roth, NHPC, 1976, Chapters 2 and 3, for example, can be considered as an authoritative theoretical reference on the subject.

Obviously, the mean free path $\lambda$ also depends on the conditions of pressure and temperature; in particular, it is directly proportional to the temperature measured in Kelvin and is inversely proportional to the pressure (see the above reference text "Vacuum Technology"). Assuming that the significant use conditions of valve systems are at ambient temperature conditions (for example in a range between 273° K and 313° K), or at a different temperature, as long as substantially constant, the pressure results to be the essential parameter.

In conditions of vacuum pressures (for example, below 1 mbar) and, even more, of high vacuum (for example, below $10^{-3}$ mbar) it is possible to obtain flows in a predominantly molecular regime even through channels of dimensions of the order of millimetres.

On the contrary, in the other pressure conditions, not of vacuum, and in particular at atmospheric pressure or higher, this is not possible.

This fact causes a problem. In fact, in a growing number of important applications, there emerges the need to be able to control micro-flows in "molecular" or "predominantly molecular" regime, even at a non-vacuum pressure. Similarly, it is desirable to be able to control and/or measure a flow with granularity and/or resolution of micro-flows in "molecular", or "predominantly molecular" regime, also for the large part of industrial applications that operate at pressures equal to, or greater than, atmospheric pressure, or at non-vacuum pressures.

This can be advantageous, e.g., for improving the accuracy of a flow meter exposed to the environment (or "micro-flow-meter"); or for managing a fluidic communication between an environment at atmospheric or higher pressure and an environment at vacuum pressure; or, again, to allow sampling a gas without having to install expensive pumping systems for creating vacuum conditions in which to perform the sampling itself with sufficient accuracy.

None of the known micro-valve systems is able to manage and control valve openings such as to ensure micro-flows in molecular, or predominantly molecular, regime also at atmospheric, or higher, pressure.

In fact, with reference to this aspect, a first problem that remains unsolved is that of realizing micro-valve openings of sufficiently small dimensions such as to ensure a molecular regime, even at atmospheric, or higher, pressure.

A second, even more difficult, unsolved problem is that of suitably controlling such micro-valve openings, even if it were possible to realize them.

A third unresolved problem concerns the ability to ensure the operability and, therefore, the non-occlusion, of such micro-valve openings even in environments of habitual use, such as industrial environments.

In view of this, therefore, there is an unsatisfied need for devices able to effectively control gaseous flows with a resolution of micro-flows in molecular, or predominantly molecular, regime, even in conditions of non-vacuum pressure.

Consequently, other needs remain not satisfied, i.e., the needs to have systems and methods for gas sampling, for measuring and/or controlling a gaseous flow and for controlling a pressure gradient that are able to advantageously operate on micro-flows in molecular or predominantly molecular regime, even at non-vacuum pressure.

In light of the above, the object of this invention is that of devising and making available a device for controlling a gaseous flows, as well as related systems and methods employing such a device, that are improved so as to meet the above-mentioned needs, and that are able to overcome, at least partially, the drawbacks described above with reference to the known art.

SUMMARY OF THE INVENTION

This object is achieved by a device according to claim 1.

Further embodiments of the device are defined in the dependent claims 2 to 18.

A system for gas sampling, employing the device according to the invention, is defined in claim 19. A further embodiment of such a system is defined in claim 20.

A system for controlling a pressure gradient, employing the device according to the invention, is defined in claim 21.

A method for controlling a gaseous flow, carried out using the device of the invention, is defined in claim 22.

A method for measuring a gaseous flow, carried out using the device of the invention, is defined in claim 23.

A method for sampling a gas, carried out using the device of the invention, is defined in claim 24.

A method for managing a pressure gradient, carried out using the device of the invention, is defined in claim 25.

BRIEF DESCRIPTION OF THE DRAWINGS

Further characteristics and advantages of a device for controlling a gaseous flow, according to this invention, and of systems and methods employing such a device, will result from the following description of preferred embodiments, provided as non-limiting examples, with reference to the accompanying figures, wherein:

FIGS. 8A and 8B show details of the device of FIG. 7;

FIGS. 10A and 10B show details of the device of FIG. 9;

FIG. 16 shows a system for controlling a pressure gradient according to the invention, in a possible application context.

DETAILED DESCRIPTION

Figure 1:
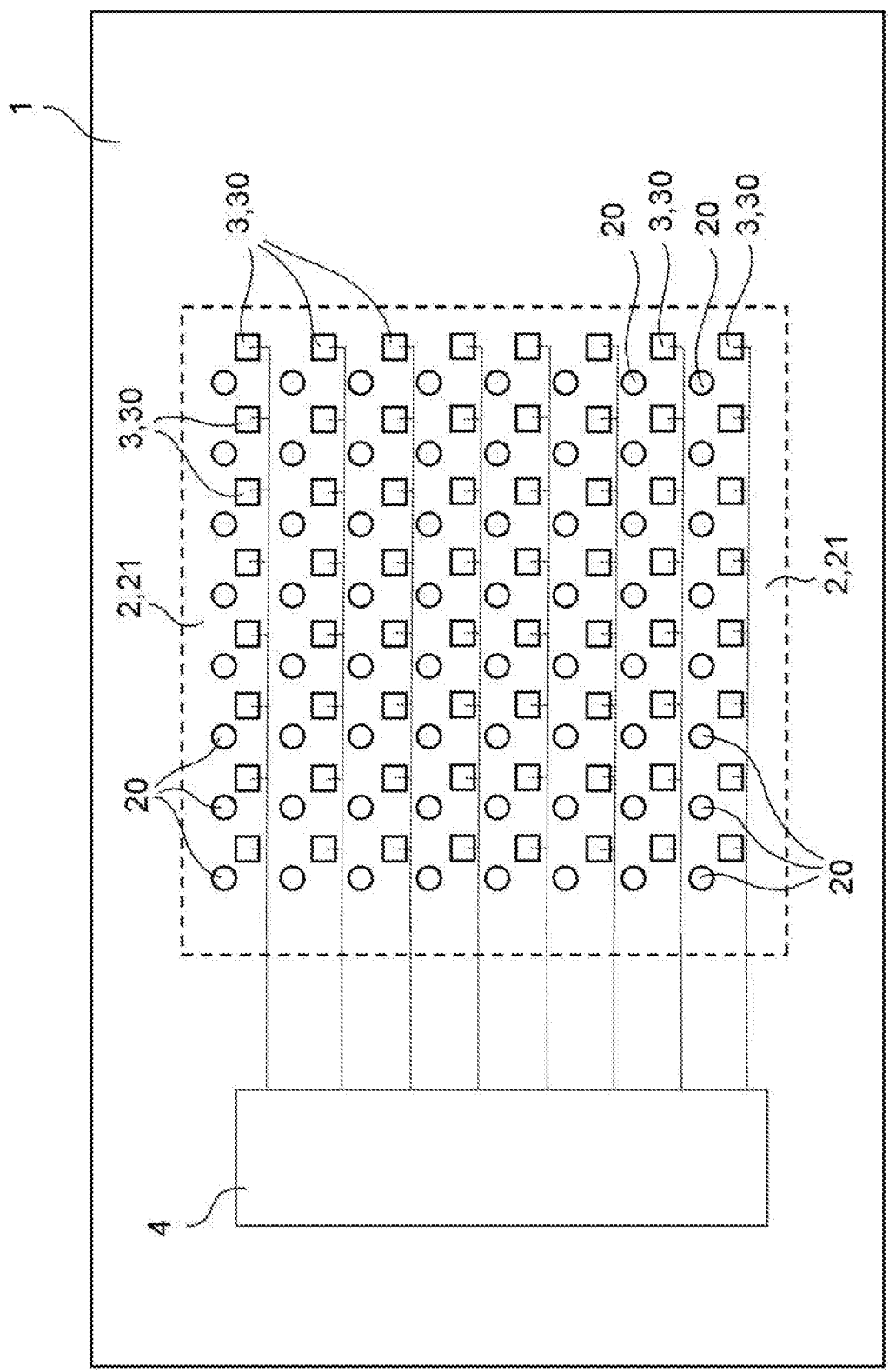
FIG. 1 is a simplified structural diagram of the device according to the invention, seen from above, with nano-holes open.

With reference to FIGS. 1-13, a device 1 for controlling a gaseous flow is described.

The device 1 comprises a gaseous flow adjusting interface 2, configured to inhibit or allow a gaseous flow through the device 1 in a controlled manner, and also comprises control means 3, 4 of the adjusting interface.

The adjusting interface 2 comprises a plurality of nano-holes 20. Each of the nano-holes has sub-micrometer dimensions and is suitable to be opened or closed, in a controlled manner.

The control means 3, 4, in turn, comprise actuating means 3, suitable to open or close the nano-holes, and electronic processing means 4, configured to activate the actuating means to individually or collectively open or close the nano-holes 20 in a controlled manner.

Figure 2:
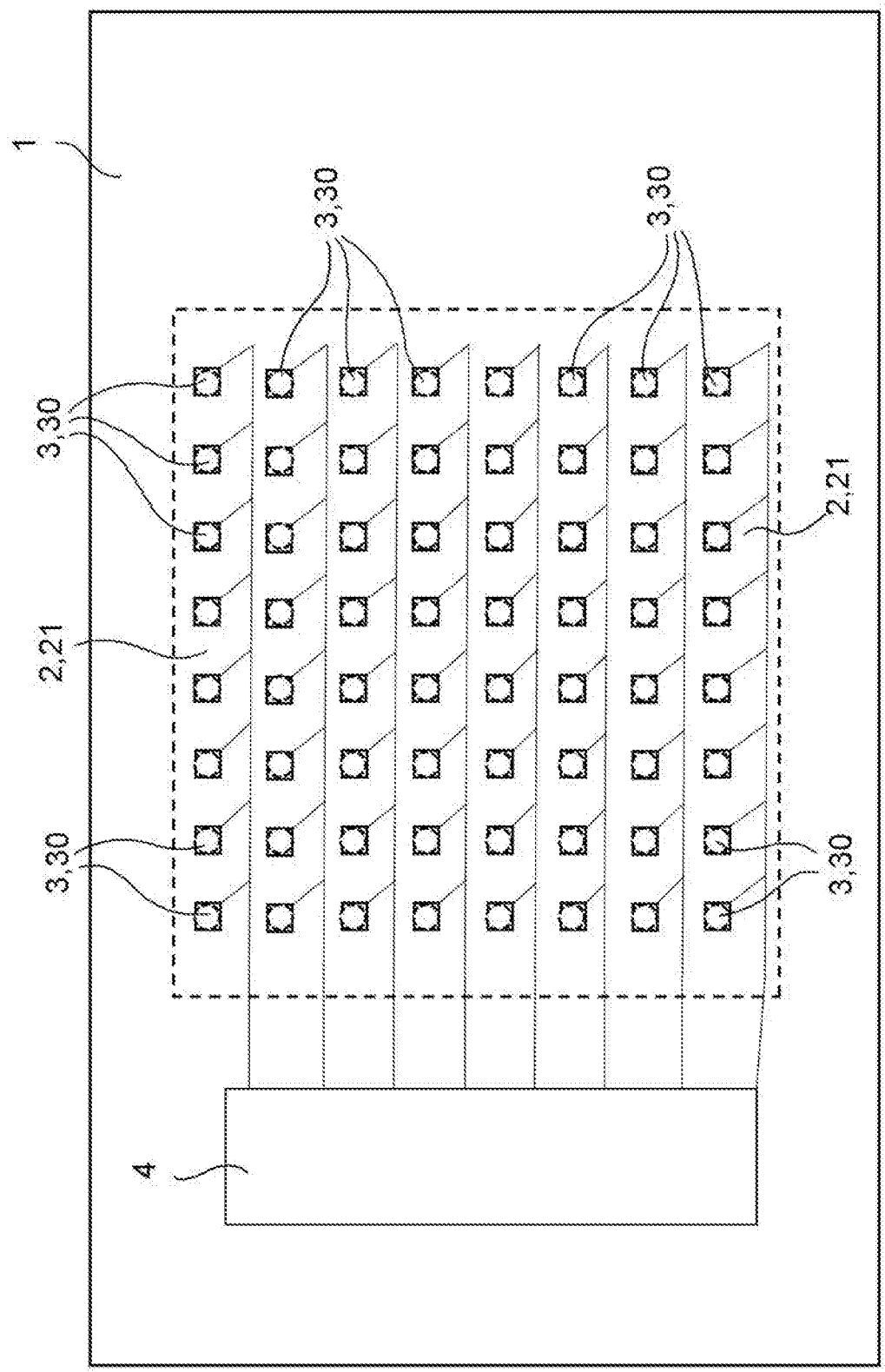
FIG. 2 represents the structural diagram of FIG. 1, in a condition of nano-holes closed.

FIGS. 1 and 2 show respective top views of an embodiment of the device 1, wherein the nano-holes are, respectively, open and closed.

According to an implementation example, each of the nano-holes 20 is configured to allow a gaseous micro-flow at a molecular or predominantly molecular regime, even in conditions of atmospheric pressure or above, when it is open, and instead to inhibit such gaseous micro-flow, when it is closed, so that the overall gaseous flow passing through the adjusting interface 2 is the sum of the micro-flows at a molecular or predominantly molecular regime passing through the open nano-holes 20.

As already specified, indicating that a flow or micro-flow is at a "molecular regime" means indicating a flow in which, given the conditions of pressure and temperature, the parameter $D/\lambda$ is comparable to, or less than, 1; indicating that a flow or micro-flow is at a "predominantly molecular regime" means indicating a flow in which the parameter $D/\lambda$, although greater than 1, is of the order of magnitude of a few units (conventionally, <10).

According to an implementation example, each nano-hole 20 is configured to allow micro-flows between $10^{-8}$ and $10^{-6}$ mbar·l·sec$^{-1}$. In this way, the device 1 can control gaseous flows with an accuracy and a very fine granularity, equal to one of these micro-flows. Other flow values are of course possible, depending on the dimensions with which the nano-holes are made, and on the pressure gradient to which the nano-holes are subjected.

It is evident, from the foregoing, that the structural aspect of the device, relative to the fact that the flow adjusting interface allows a passage of gas exclusively through the nano-holes of sub-micrometric dimensions, is enabling with respect to the functionality of allowing flows in molecular or predominantly molecular regime. In fact, it can be calculated that, within a very wide temperature range that covers all conditions of reasonable use, and for almost every type of gas, channels of sub-micrometer diameter allow obtaining the values of $D/\lambda$ desired (less than 10, in any case, and preferably comparable to 1 or lower) even at atmospheric or higher pressures.

Advantageously, the specific dimension chosen, within the sub-micrometric interval, for the nano-holes of a specific embodiment of the device, can take into account of the pressure conditions specified in the conditions of use.

The sub-micrometric dimensions of each nano-hole imply that the diameter of the nano-hole (i.e., the dimension on a plane substantially perpendicular to the flow) is of the order of magnitude of hundreds of nanometres or less.

According to an implementation example, each nano-hole 20 has a diameter in the range from 10 to 100 nm, and preferably between 20 and 100 nm. Other values (for example between 50 and 500 nm) are possible, depending on the design specifications of the device.

According to an implementation example, the nano-holes are formed in a membrane 21, having a thickness of the order of hundreds of nanometres (nm) or lower (thus, typically an order of magnitude comparable to that of the diameter), and preferably between 50 and 500 nm.

According to other implementation examples, the membrane may be thicker.

According to a preferred embodiment, each nano-hole 20 has a defined geometry and a deterministically measurable conductance, the conductance being a parameter that quantifies the micro-flows that can pass through the nano-hole.

Preferably, the geometry of the nano-holes 20 is substantially cylindrical.

Thus, in the preferred embodiment, described above, each nano-hole is approximately a cylinder, or tube, having a diameter of the order of tens or hundreds of nm, and a height of the order of hundreds of nm.

Figure 3:
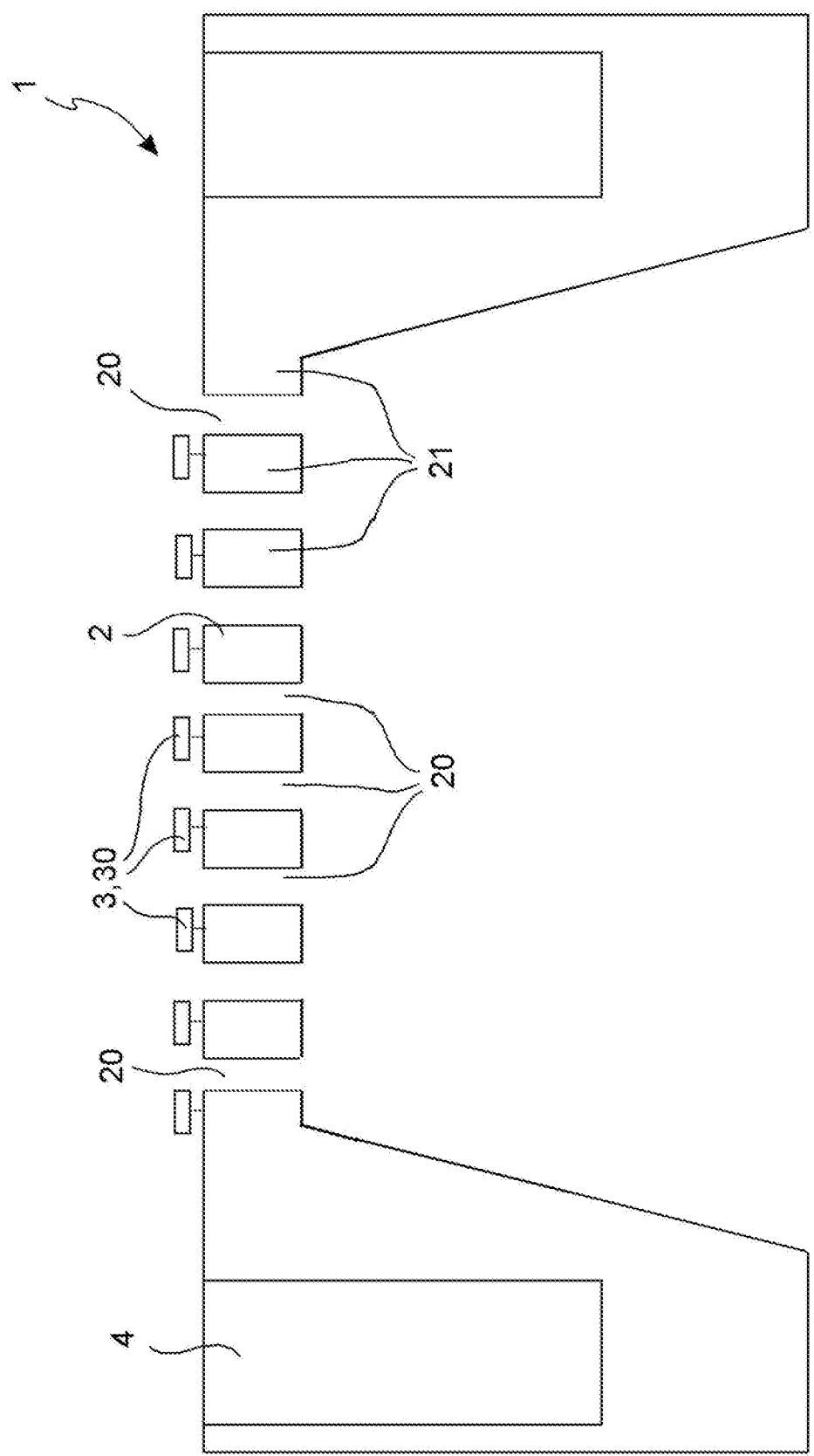
FIG. 3 is a side sectional view of the device of FIG. 1, relating to a section passing along a median line with respect to a row of nano-holes.

Such an embodiment of the nano-holes is illustrated for example in the top view of FIG. 1 and in the side section of FIG. 3.

In other implementation examples, not illustrated in the figures, the geometry of the nano-holes is approximately truncated-conical, in which at least the minor base has a sub-micrometer diameter (typically 10 to 100 nm).

According to various implementation examples covered by the invention, the distribution, number and size of the nano-holes 20, formed in a membrane 21 of the adjusting interface 2, may be the most varied. The adjusting interface 2 may thus comprise nano-holes 20 of all equal sizes, or different from each other, in any combination.

The number of nano-holes 20 of the adjusting interface 2 can vary from several tens to several hundreds, or even thousands. This advantageously allows obtaining flows of significant intensity, even if formed by micro-flows, by opening all the nano-holes.

The arrangement of the nano-holes 20 on the adjusting interface 2 may be the most varied.

According to a preferred implementation example, illustrated in the accompanying figures, the nano-holes 20 are arranged in a two-dimensional array of rows and columns.

In a particular example, the centre to centre distance between two adjacent nano-holes, in a row or column, corresponds to approximately twice the diameter of the nano-hole.

According to an embodiment option, the adjusting interface 2 comprises one or more flow control windows, each window comprising a membrane 21, through which the nano-holes 20 are derived.

Each membrane 21 can be planar or non-planar.

In a typical implementation example, the membrane 21 is planar, substantially rectangular or square, with sides of dimensions of the order of tens of micrometres, and can contain a number of nano-holes of the order of hundreds.

It should be noted that the adjusting interface 2, with a membrane 21 and any predetermined arrangement of nano-holes having desired dimensions and geometries, can be obtained by techniques, in themselves known, for manufacturing membranes with holes of sub-micrometric dimensions.

Such techniques are known, for example, in the context of nano-technologies for the production of membranes for chemical-biological applications. Another example of usable techniques involves the use of silicon membranes that are perforated, in a controlled manner, by a SEM (Scanning Electron Microscope) equipped with an FIB (Forced Ion Beam) module. In this way, nano-holes of the type described above (in literature sometimes also called "nano-orifices" or "nano-pores") can be formed on the silicon membrane, as shown for example in the scientific papers: Lo, Aref, Bezryadin "*Fabrication of symmetric sub-5 nm nano-pores using focused ion and electron beams*" (Nanotechnology 17(2006)3264-3267); and Stein et al., "*Ion Beam Sculpting Time Scales*" (Physical Review Letter, vol. 89, no. 27, 30, Dec. 2002).

Referring now to the ways of actuating the nano-holes, it should be noted that the most various strategies are made possible by the structure of the device 1, illustrated here.

In a preferred example embodiment, able to offer maximum flexibility of use, the processing means 4 are configured to control the actuating means 3, so that each nano-hole 20 can be opened or closed individually and in an independent manner with respect to the other nano-holes 20.

According to an alternative example, also included in the invention, the processing means 4 are configured to control the actuating means 3, so as to selectively open or close one or more groups of such nano-holes 20, groups comprising, for example, sub-sets of nano-holes adjacent to each other in an array of nano-holes. In this case, the nano-holes of each sub-set can be all opened or all closed, independently from the opening/closing of the nano-holes of the other sub-sets.

According to another example, the nano-holes 20 are all opened or all closed, collectively.

Figure 4:
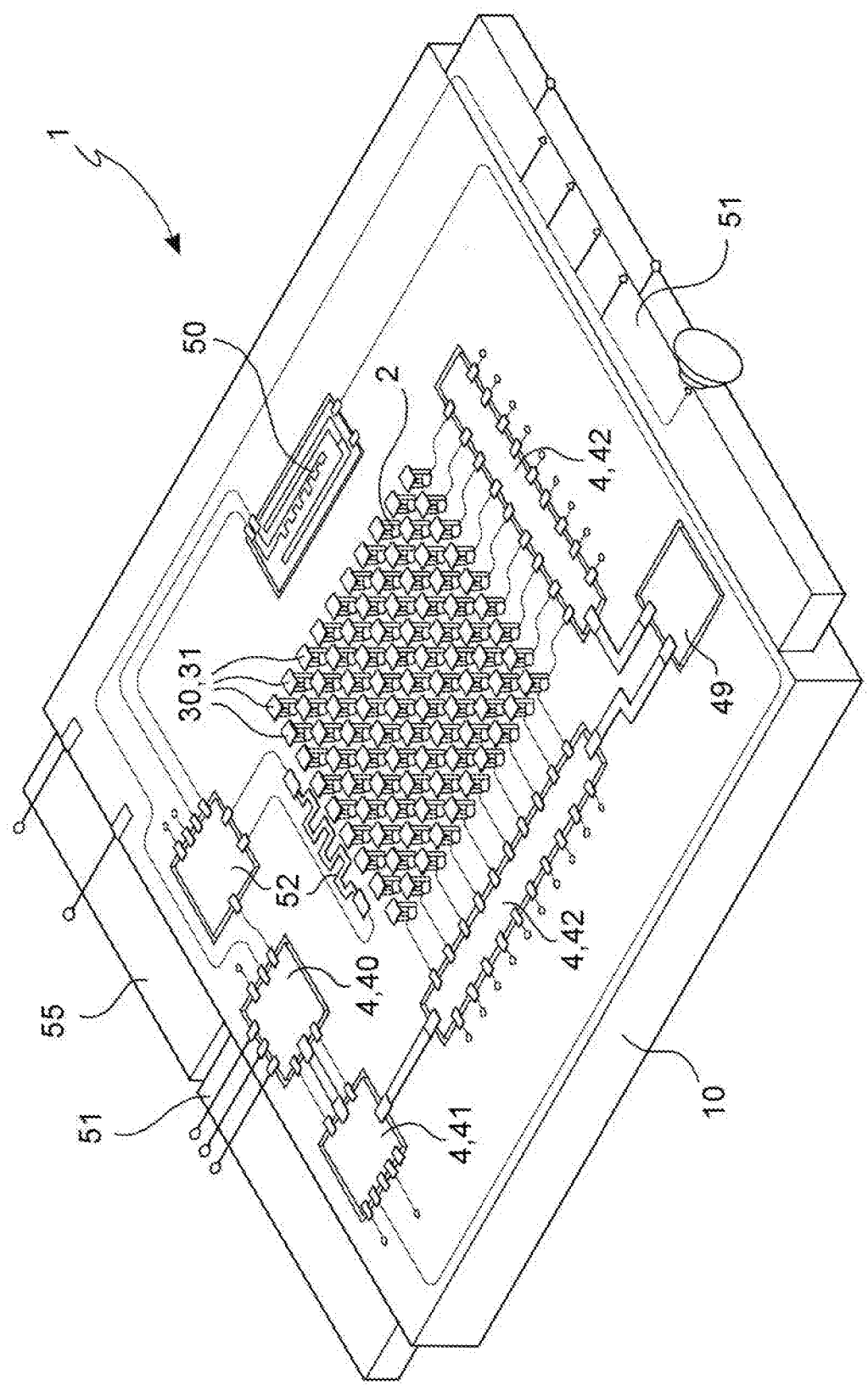
FIGS. 4, 5A and 5B are respective perspective views of an embodiment of the device, in a condition of nano-holes all open, a condition of nano-holes all closed, and a condition in which some nano-holes are open and others closed, respectively.
Figure 5A:
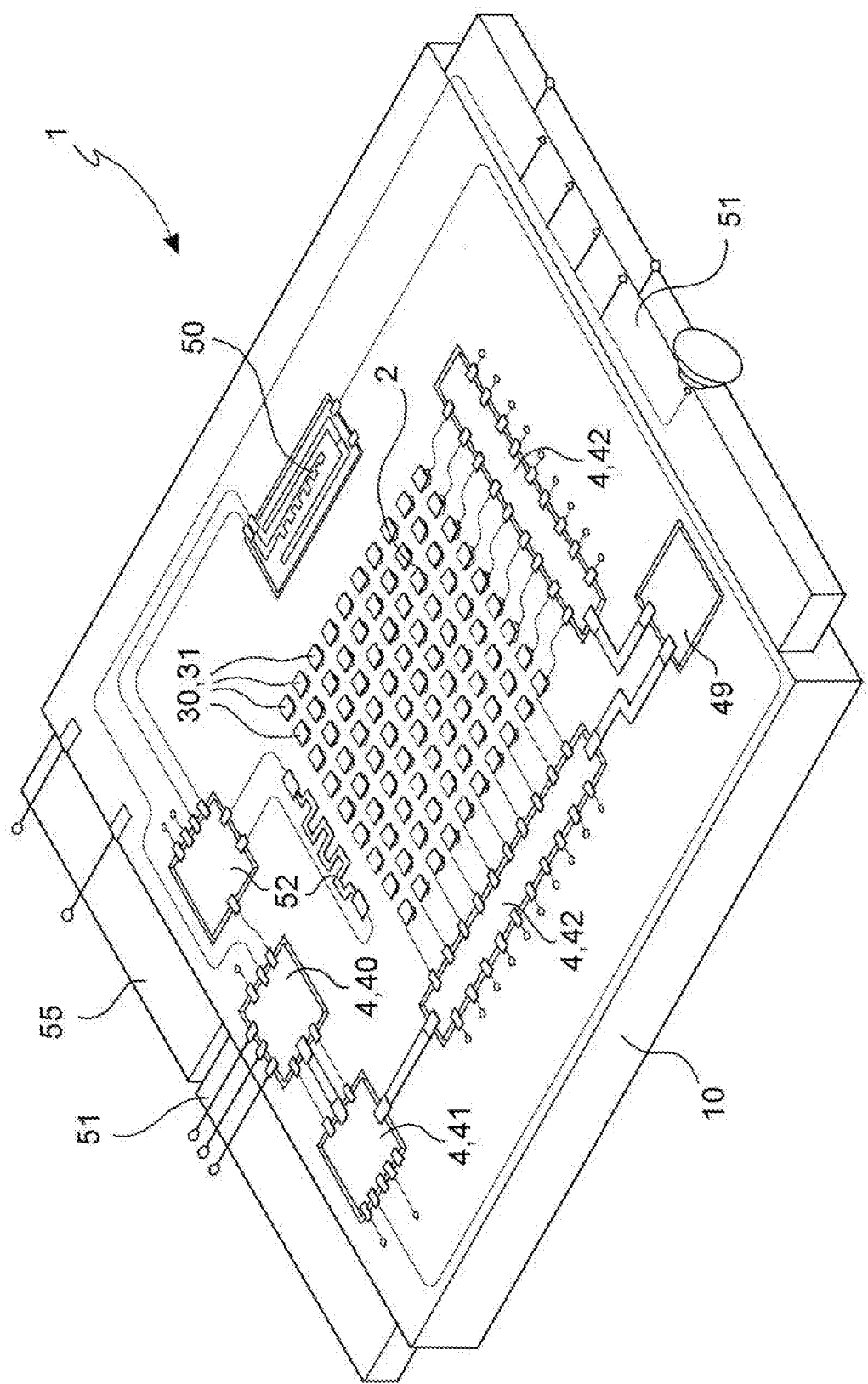
Figure 5B:
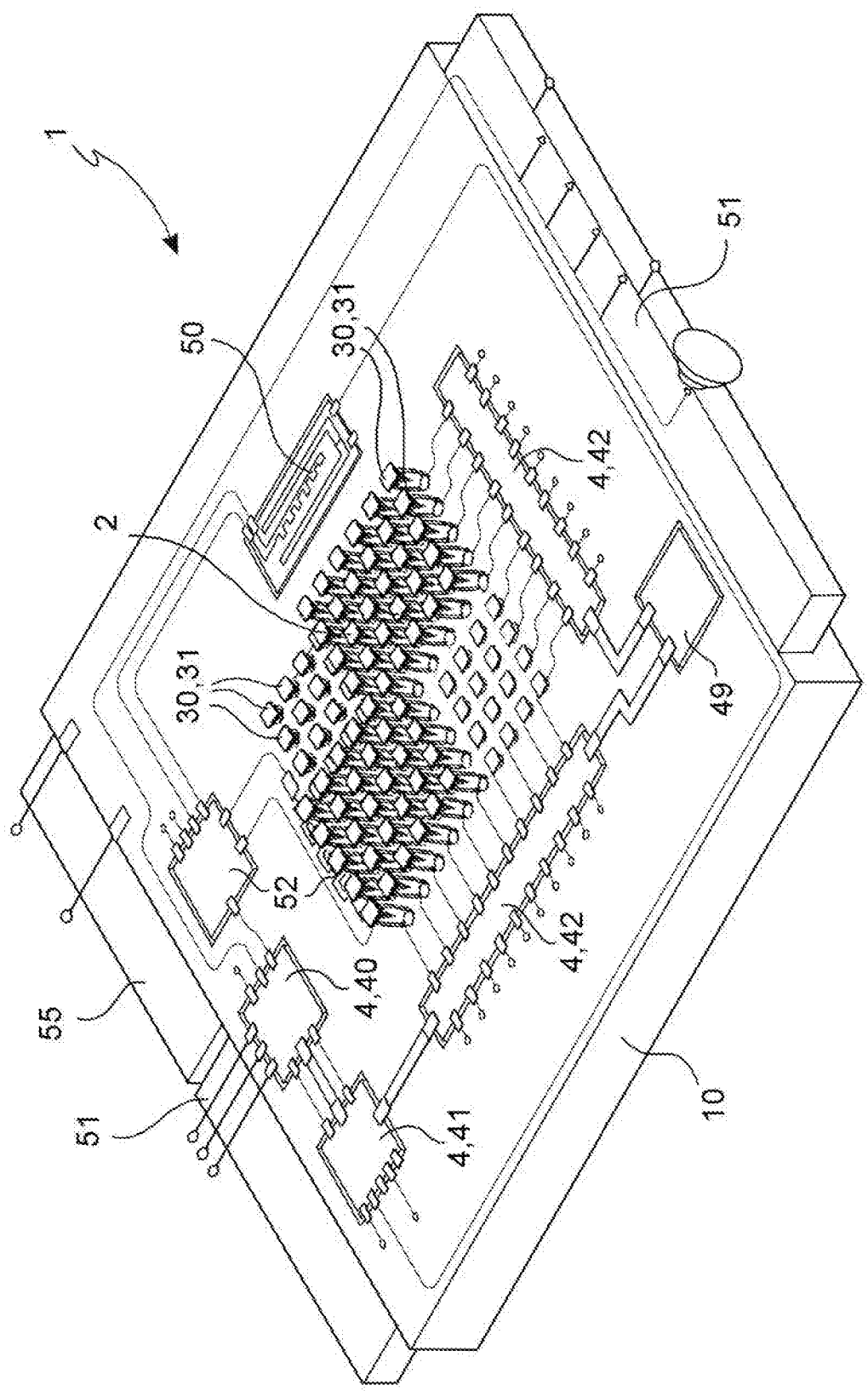
Figure 6A:
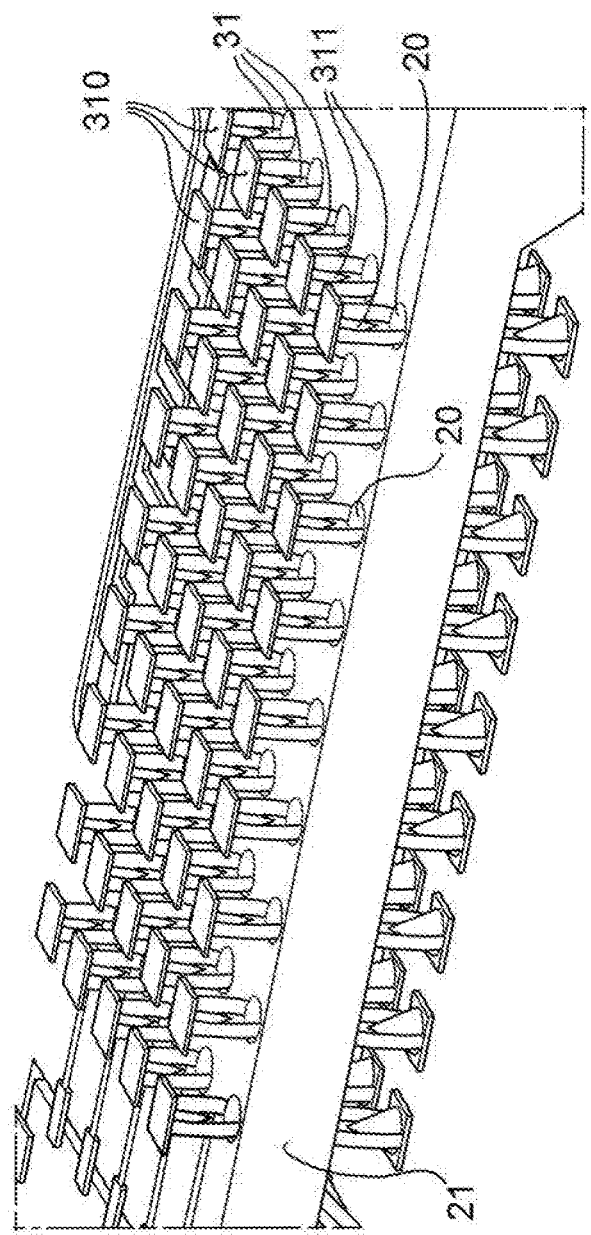
FIGS. 6A and 6B show details of the device of FIGS. 4 and 5, respectively.
Figure 6B:
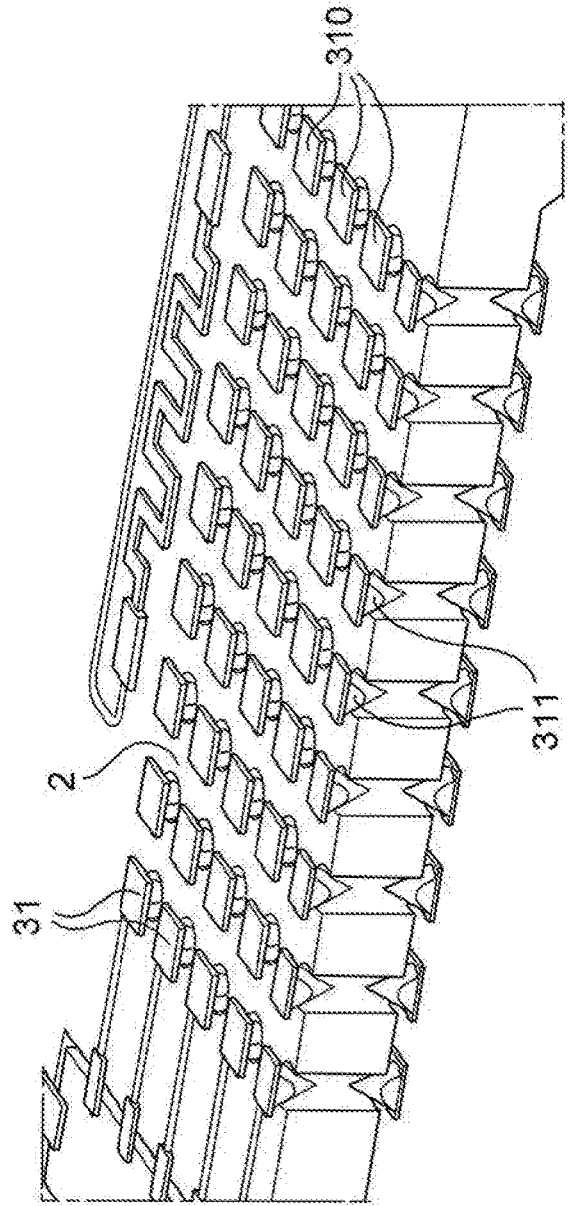
Figure 7:
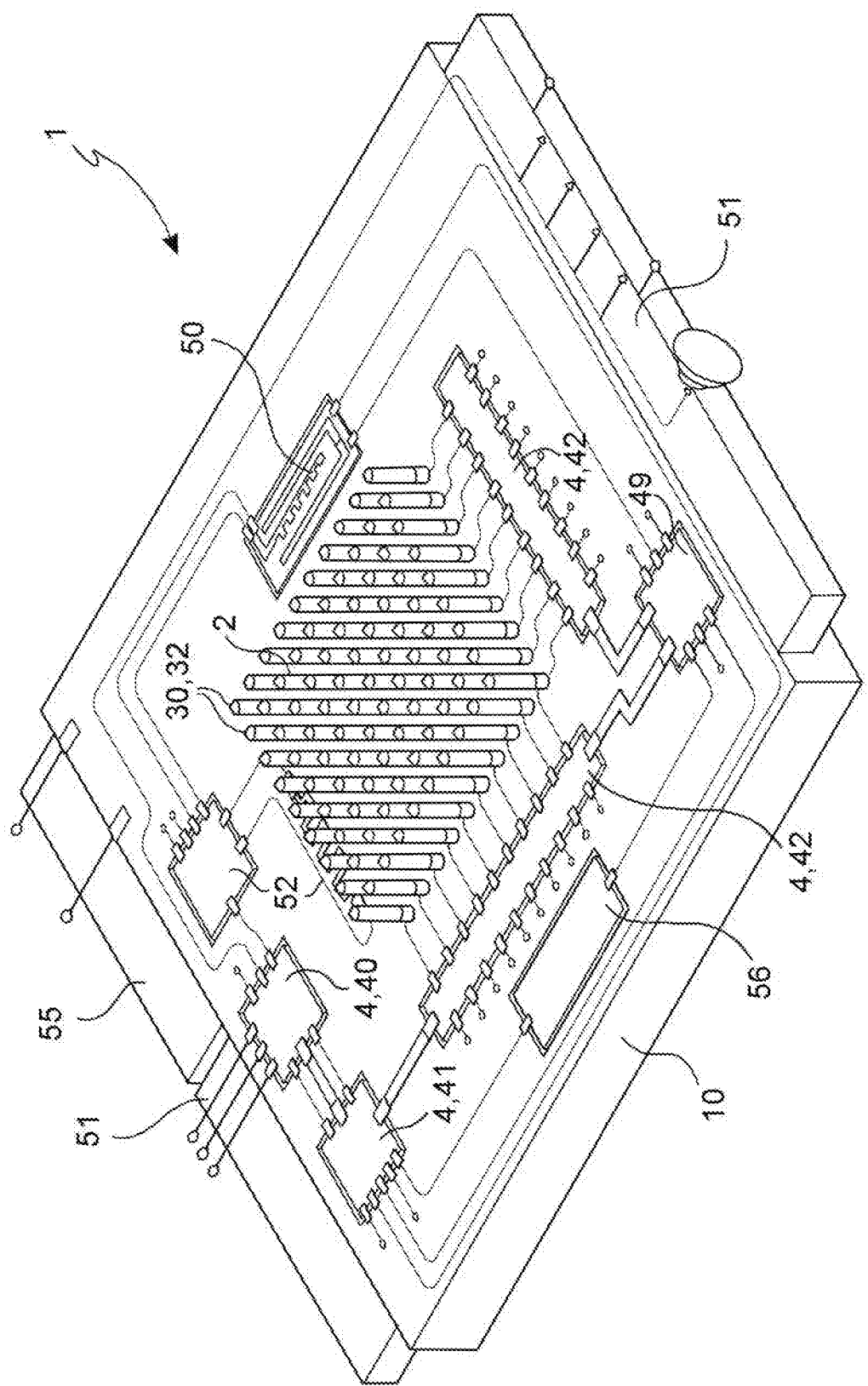
FIG. 7 is a perspective view of a further embodiment of the device.
Figure 9:
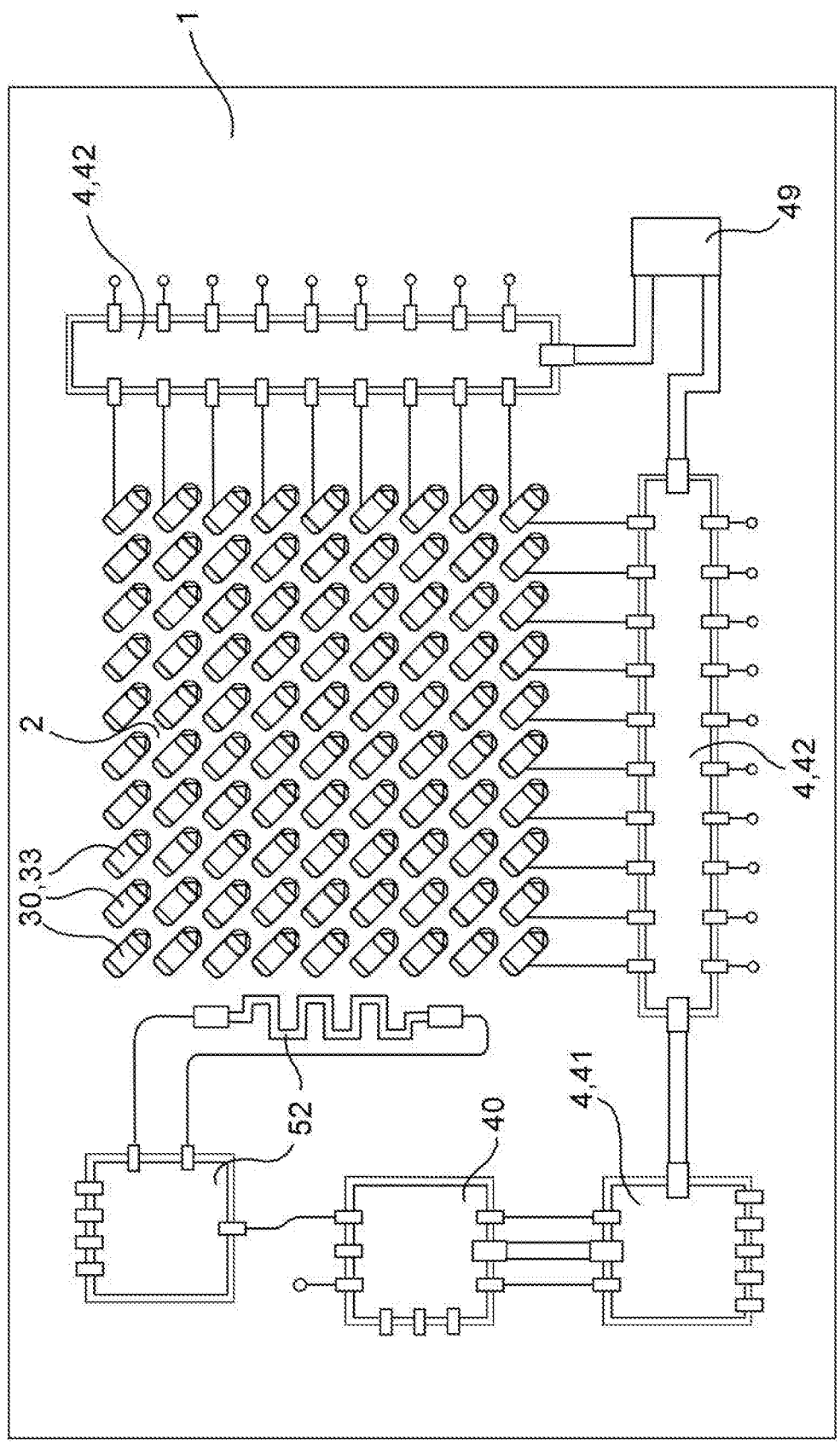
FIG. 9 is a perspective view of a further embodiment of the device.
Figure 11:
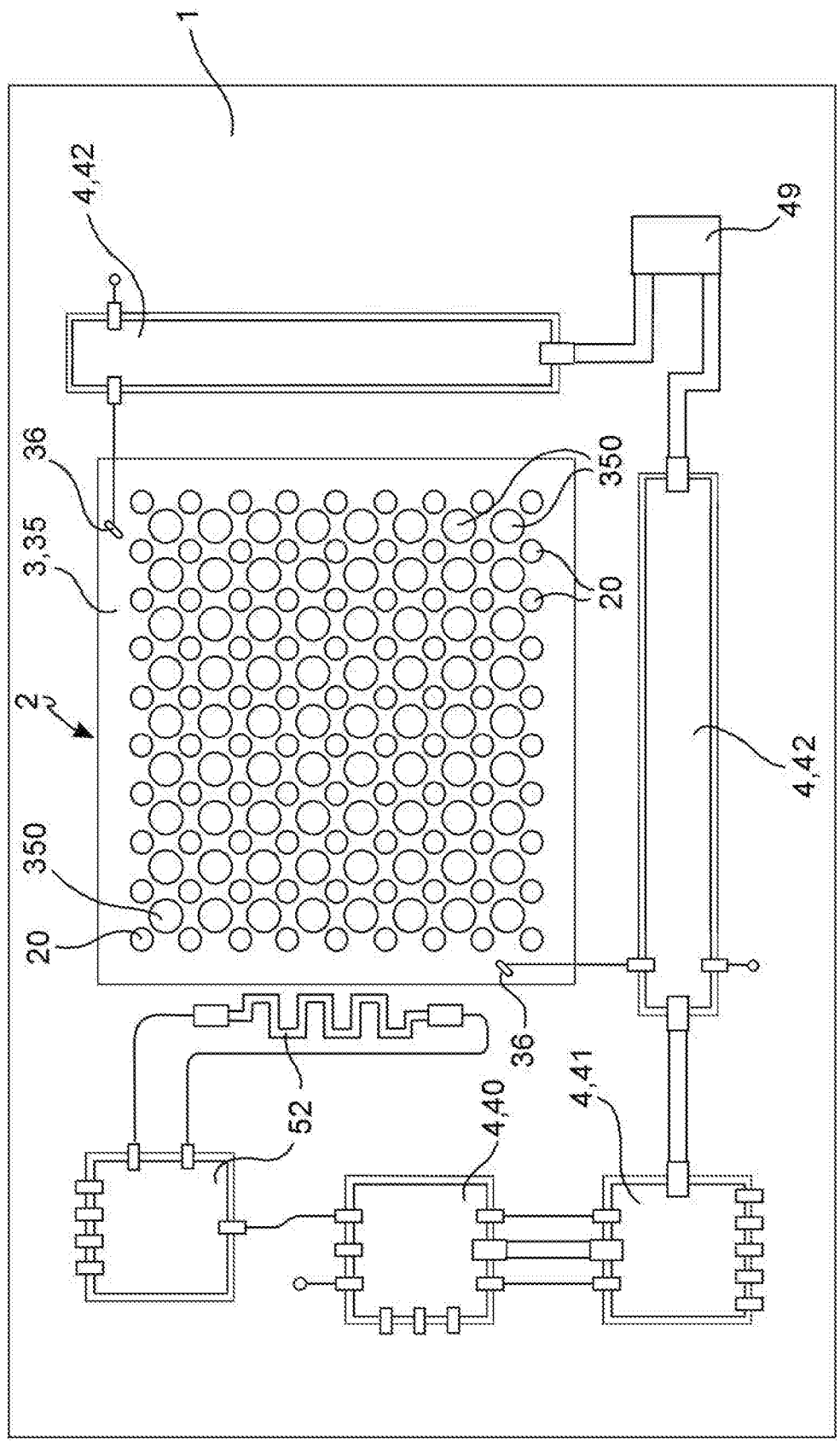
FIG. 11 is a perspective view of a further embodiment of the device.

By virtue of the above, the device 1 according to the invention provides a control in which any combination, pattern and/or arrangement of opened or closed nano-holes is possible: for example, with nano-holes all opened (as shown in FIG. 4) or with nano-holes all closed (as shown in FIG. 5A) or with some nano-holes opened and others closed (as shown in FIG. 5B). Furthermore, the combination, pattern and/or arrangement of opened or closed nano-holes can be dynamically changed over time in a desired manner.

According to an embodiment, the device 1 is an integrated device.

In particular, according to an implementation option, illustrated for example in FIGS. 4 and 5A/5B the adjusting interface 2 and the control means 3 are comprised in a single miniaturized chip 10 of the integrated device 1.

In the examples illustrated in FIGS. 4-12, the actuating means 3 comprise a plurality of miniaturized nano-hole opening/closing members 30.

Each miniaturized nano-hole opening/closing member 30 is suitable to open or close a corresponding nano-hole 20, so as to maximize or minimize, respectively, the conductance of the nano-hole 20.

In a particular implementation example, each miniaturized nano-hole opening/closing member 30 is configured to hermetically seal the respective nano-hole 20, thus reducing to zero its conductance, or to fully open the nano-hole 20, thus allowing a flow of gas through it. The property of "hermetic" closure can be defined in the design stage in relation to the size of gaseous molecules whose flow must be controlled.

According to an embodiment of the device (shown in FIGS. 4, 5A and 5B, and in the details of FIGS. 6A and 6B), each miniaturized nano-hole closing/opening member 30 comprises a plug 31 electro-mechanically actuatable to close or open the respective nano-hole 20, by means of an axial movement with respect to the nano-hole.

In particular, the plug 31 may comprise a base 310, having larger dimensions than the nano-hole 20, so as to completely obstruct an outlet of the nano-hole 20, on a side of the adjusting interface 2 at which the plug 31 is located, upon the closure movement; and, in addition, a tip 311, which is integral to the base 310, suitable to penetrate the nano-hole 20, upon the closure movement.

According to a further embodiment of the device (illustrated in FIG. 7 and in the details of FIGS. 8A and 8B), each miniaturized nano-hole closing/opening member 30 comprises a cylinder 32, having a diameter substantially equal to that of the respective nano-hole 20, the cylinder 32 being electro-magnetically actuatable to be inserted into or extracted from the corresponding nano-hole 20, by an axial movement with respect to the nano-hole.

In an implementation example of this embodiment, the device 1 comprises a plurality of solenoids 320, each associated to a corresponding nano-hole 20 and a corresponding cylinder 32, and coaxial thereto. Furthermore, each cylinder 32 comprises parts made of a ferromagnetic or paramagnetic material, so as to be sensitive to a magnetic field generated by the solenoids 320 and to move as a function of said magnetic field.

According to a further embodiment of the device (illustrated in FIG. 9 and in the details of FIGS. 10A and 10B), each miniaturized nano-hole closing/opening member 30 comprises a micro-cantilever 33, having, at an oscillating end, a micro-tip 330, substantially conical, suitable to be inserted in or extracted from the nano-hole. The micro-cantilever 33 is electro-magnetically actuatable so as to oscillate between a closure position, in which the micro-tip 330 enters the nano-hole 20 to close it, and an opening position, in which the micro-tip 330 exits the nano-hole 20 to open it.

The embodiments described above provide for an individual and independent actuation of each nano-hole.

For applications in which a collective actuation of the nano-holes is sufficient, a further embodiment of the device (illustrated in FIGS. 11 and 12) provides that the actuating means 3 comprise a multiple opening/closure oscillating planar member 35, configured to concurrently open/close all the nano-holes 20 of the adjusting interface 2.

Figure 12:
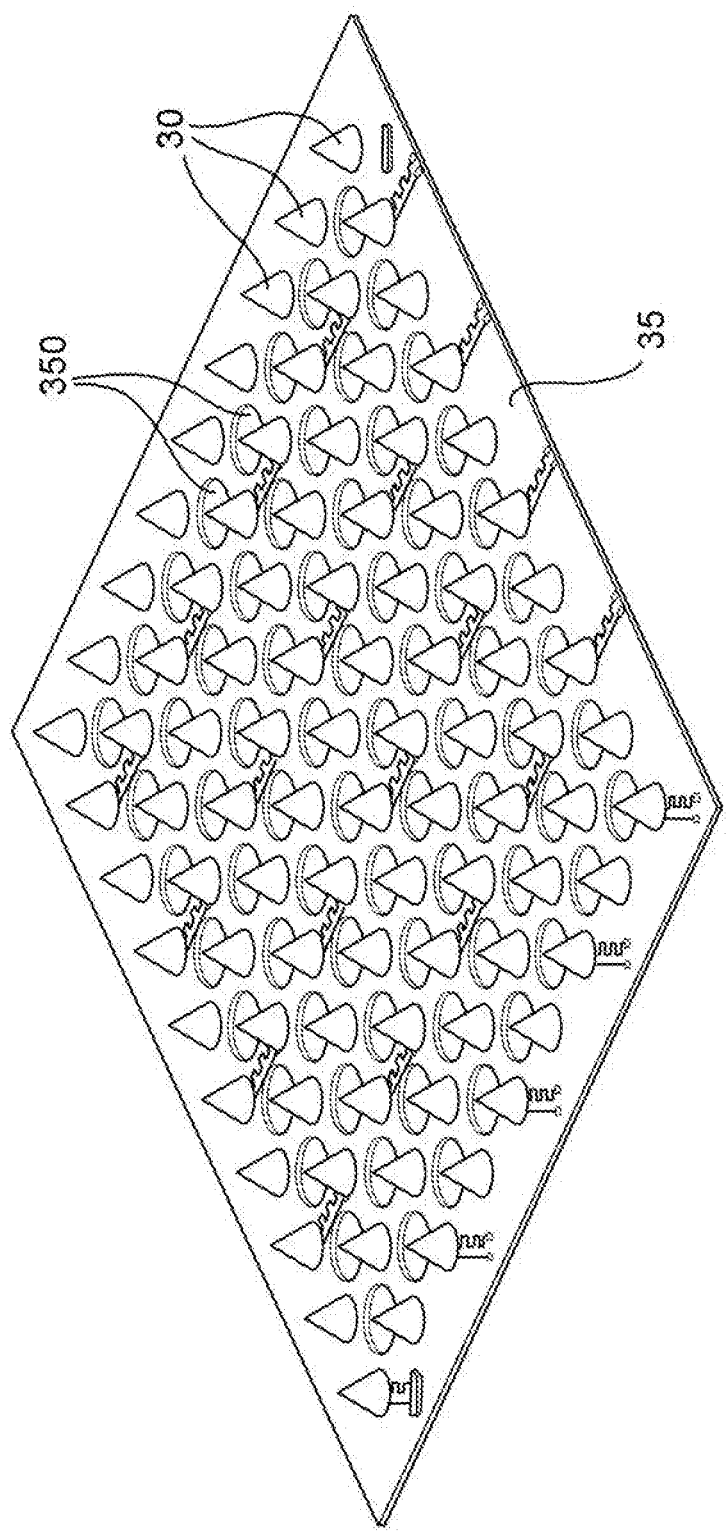
FIG. 12 shows details of the device of FIG. 11.

In this case, as shown in FIG. 12, the single miniaturized nano-hole opening/closing members 30 can be arranged on one side of the planar member 35 in a configuration corresponding to that of the nano-holes 20, so that each miniaturized opening/closing member 30 is simultaneously inserted into or extracted from the corresponding nano-hole 20, upon a corresponding movement of the planar member 35.

The multiple opening/closure oscillating planar member 35 can be actuated in an electro-mechanical or electro-magnetic manner, for example by acting on small mobile columns 36, placed at the corners of the planar member 35, and integral with it.

In a particular implementation example, the oscillating planar member 35 also comprises holes 350, in areas other than those in which are present the single miniaturized nano-hole opening/closing members 30, so as to facilitate the conductance of gas in correspondence of the planar member 35. These holes 350 can be freed from any obstructing deposits, upon each oscillation event, for example by counter-tips provided on a base of the adjusting interface 2, in positions corresponding to the holes 350.

According to an implementation example, the actuating means 3, in any of the embodiments described above, are arranged on one side of the adjusting interface and configured to open/close the opening of each nano-hole 20 corresponding to that side.

According to an alternative implementation example, such actuating means 3 (or at least parts of them) are arranged on both sides of the adjusting interface 2, and are suitable (or configurable) to open/close both openings of each nano-hole 20, corresponding to both sides of the adjusting interface 2, i.e., both ends of the tubular micro-channel formed by the nano-hole. In this case, each miniaturized nano-hole opening/closing member 30 is configured to penetrate into the nano-hole 20, in conditions of closure, entering from the respective side.

Advantageously, the miniaturized opening/closing members 30 are further configured to clean and clear each nano-hole 20 of possible obstructions (due, for example to molecular mono-layers that may be deposited), upon each operative event of closure and subsequent opening or upon specific anti-obstruction closure/opening events. It should be noted that the anti-obstruction opening/closing events may also be provided in the form of opening/closing cycles of appropriate frequency.

This property is important to allow the use of the device in the most various environments, including environments of industrial processes with pollutants. Moreover, this property, which intrinsically derives from the structure and functionality of this device, radically distinguishes the adjusting interface 2 from any existing membrane with nano-pores, but without actuation, that could not work outside of exceptionally clean environments (such as, for example, clean rooms).

With reference now to further structural and functional aspects of the device, shown in FIGS. 4-13, the following aspects should be noted.

The electronic processing means 4 comprise a processor 40, operatively electrically connected to the actuating means 3, so as to control them by sending electric signals.

Advantageously, the processor 40 is operatively electrically connected to each of the nano-hole opening/closing members 30.

In an implementation example, the electronic processing means 4 also comprise a buffer (that can be integrated in the same processor), a driving member 41 and a multiplexer 42. The buffer is operatively connected to the processor 40 to receive opening/closure control signals relating to a plurality of nano-holes. The driving member 41 is operatively connected to the buffer to sequentially receive said opening/closure control signals, and configured to sequentially generate corresponding opening/closure driving signals relating to a plurality of nano-holes. The multiplexer 42 is operatively connected to the driving member 41 to receive in succession said opening/closure driving signals and configured to direct each opening/closure driving signal to a corresponding nano-hole 20 of the plurality of nano-holes.

The implementation described above, exploiting the fact that the speed of generation of the opening/closing commands can be significantly higher than the execution speed of the actuation, advantageously allows providing the device with a single driving member that sequentially generates the control signals for all the actuating members of the single nano-holes.

From the structural and functional aspects described above, it is evident that the device 1 allows executing the most varied flow control strategies.

In a possible example, the control means 3, 4 are configured to control the gas flow passing through the adjusting interface 2 by determining the pattern of open and closed nano-holes 20, in terms of the number and position of open and closed nano-holes.

In another example, the control means 3, 4 are configured to control the flow of gas passing through the adjusting interface 2 by means of a determination of the ratio between opening time and closing time of the nano-holes 20, i.e., the duty cycle. In this case, the driving member 41 may further comprise a frequency generation circuit.

It is also possible to configure the control means 3, 4 to control the flow of gas passing through the adjusting interface 2 by means of an individual determination, for each nano-hole 20, of both the condition of opening or closing and the duty cycle.

In a further implementation example, each nano-hole 20 is configured to assume an operative condition of full opening or full closing, or one or more operating conditions of intermediate opening, in which a micro-flow is allowed that is not zero but less than the maximum (full opening) micro-flow. In this case, the control means 3, 4 are configured to control the flow of gas passing through the adjusting interface 2 also by determining one or the other of such operative conditions of each single nano-hole.

According to an embodiment, the device 1 further comprises one or more pressure sensors 50. Each of the pressure sensors 50 is configured to measure a respective pressure value, present in the vicinity of the sensor itself, and to provide the measured pressure value to the processing means 4.

In a particular implementation example, the device 1 comprises a sealing support, incorporating the adjusting interface 2, configured so that the only flow possible between the two opposite sides of support, suitable to face environments having different pressures, is the controlled flow through the adjusting interface.

In this case, the device 1 advantageously comprises, on opposite sides with respect to the sealing support, two corresponding miniaturized pressure sensors 50, configured to measure a corresponding pressure value and to provide the measured pressure values to the processing means 4.

According to an embodiment, the device 1 also comprises an input/output interface 51, operatively connected to the electronic processing means 4, and configured to send outside the device, or to receive from outside the device, control and/or monitoring and/or calibration and/or diagnostic signals.

In several implementation examples comprised in the invention, the electronic processing means 4 are configured to control a gaseous flow through the adjusting interface 2 on the basis of control signals coming from outside the device via the input/output interface 51, and/or on the basis of the pressure values measured by the miniaturized pressure sensors 50.

Optionally, the device 1 also comprises a reference pressure sensor 56 (shown for example in FIG. 7), encapsulated in a sealed and/or openable environment, and configured to provide a reference signal to the processing means 4 for calibration and/or diagnostic functions of device. In this case, the processing means 4 may further comprise a lock-in circuit 49.

According to an implementation example, the device 1 also comprises a power supply interface 55.

According to an example embodiment, the device 1 also comprises controlled heating means 52, configured to maintain a desired temperature, under the control of the processing means 4.

In a particular example, not shown in the figures, the controlled heating means further comprise a miniaturized resistor for each nano-hole, arranged in the vicinity of the respective nano-hole or in correspondence of the respective opening/closing member.

According to a further example embodiment, the device 1 further comprises means for filtering particulates, arranged so as to cover the entire device (for example, equipped with filters with micro-metric frames).

Furthermore, the device 1 may comprise thin protection films 53, configured to reduce the adsorption of process gas (for example, hydrophobic films to prevent the adsorption of moisture present in the process environment) and to prevent corrosion.

Figure 13:
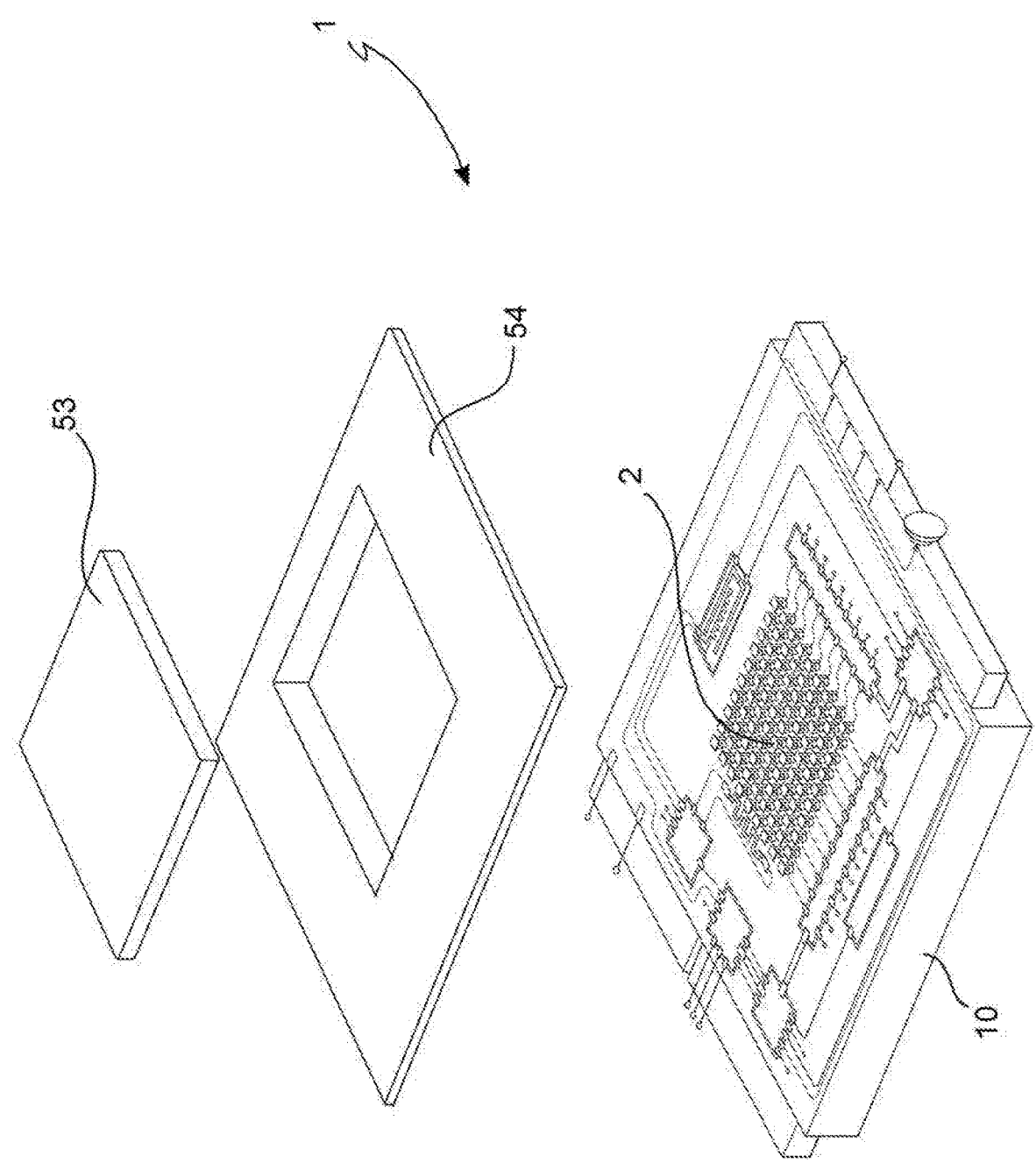
FIG. 13 is an exploded view of a still further embodiment of the device.

In a particular embodiment, illustrated in FIG. 13, the device 1 further comprises a connector member 54, configured to physically separate the adjusting interface 2 from the processing means 4, while, at the same time, allowing an operative connection, so that the adjusting interface 2 has its sides facing on two environments of different pressures, while the processing means 4 are completely surrounded by an isobaric and/or temperature controlled environment. This embodiment can advantageously allow a more effective cooling of the device.

It should be noted that the electronic processing means 4 can be configured to perform a diagnostic procedure of the device, on the basis of a processing of the data received from the at least one pressure sensor 50, or of stored data relating to nominal conductance values or predetermined conditions of environments in which the device is intended to be placed, so as to identify possible operating anomalies of device.

In addition, the electronic processing means 4 can be configured to perform, if the diagnostic procedure gives a negative result, a procedure for the adjustment and/or compensation and/or optimization of the device, to correct and/or compensate for the operating anomalies identified, based on the results of the aforesaid diagnostic procedure.

This adjustment procedure, as well as actions to prevent unwanted condensation and/or to prevent unintended chemical reactions, can be performed, for example, by using the already mentioned controlled heating means 52.

The device for controlling a gaseous flow 1, thanks to the functional and structural features described above, can be used in a plurality of different applications and systems. In particular, systems using the device 1, and included in this invention, will be described below.

Figure 14:
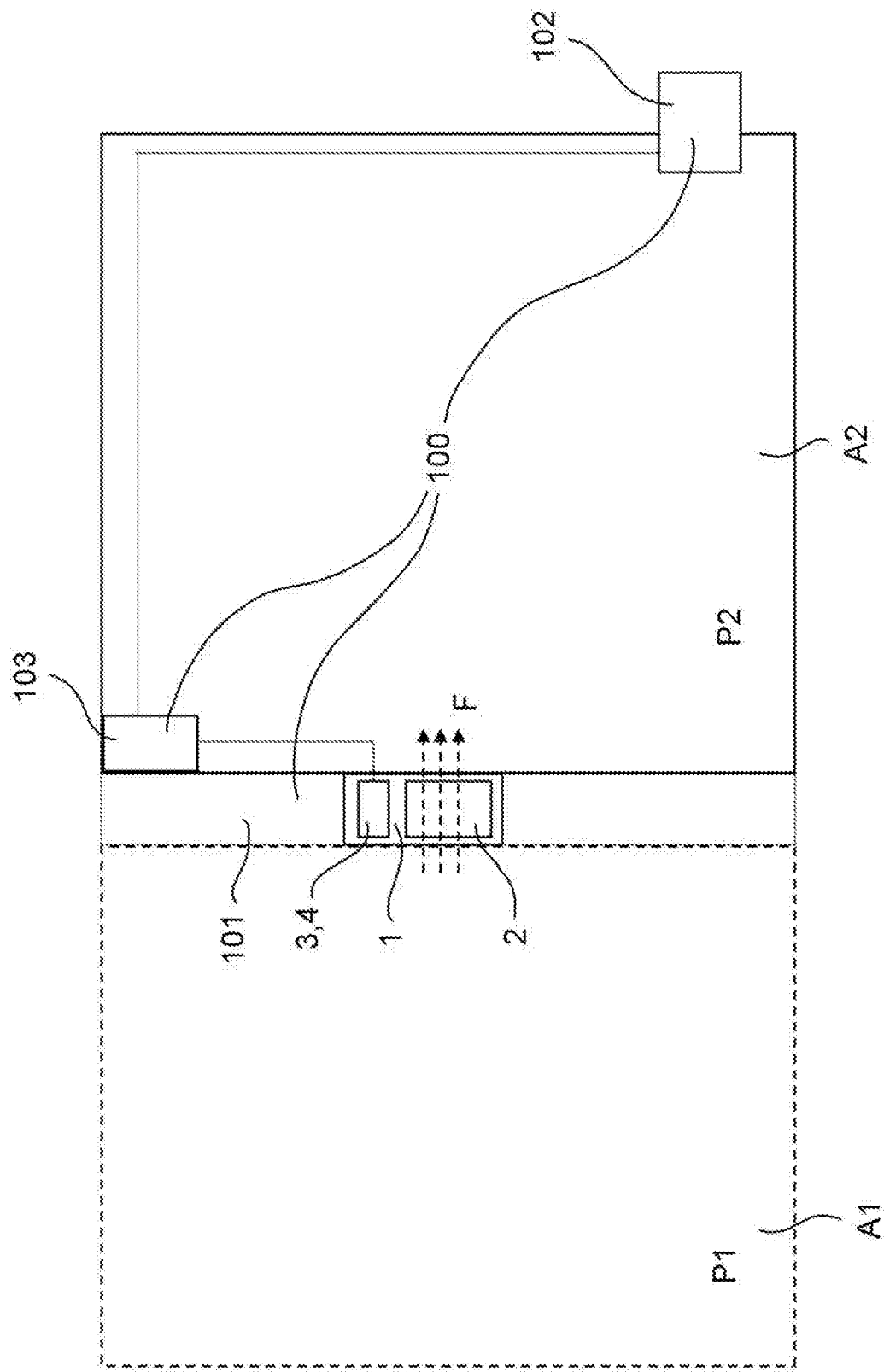
FIG. 14 shows a system for gas sampling according to the invention, in one possible application context.

Wth reference to FIG. 14, it is described a system 100 for gas sampling between a first environment A1, at a first pressure P1, and a second environment A2, at a second pressure P2 lower than the first pressure P1.

The system 100 comprises at least one device for controlling a gaseous flow 1, according to any of the embodiments previously described.

In addition, the system 100 comprises at least one separation structure 101 between said first environment A1 and second environment A2, suitable to house the corresponding at least one device 1 for controlling a gaseous flow, so that a fluid communication between the first A1 and the second A2 environments is possible only through a gaseous flow F, through the adjusting interface 2 of the at least one device 1 for controlling a gaseous flow.

The system 100 comprises pumping means 102 (for example, a pump), configured to extract gas from the second environment A2, so as to keep a desired constant pressure P2 in said second environment. It should be noted that, in the case where the second environment A2 communicates with a further environment at lower pressure, the pumping means can be simply implemented through an orifice suitable to be opened and closed.

The system 100 also comprises system control means 103, operatively connected with the control means 3, 4 of the at least one device for controlling a gaseous flow 1 and with the pumping means 102. The system control means 103, comprising a processor, are configured to control the at least one device for controlling a gaseous flow and the pumping means 102, so as to reproduce in the second environment A2 the same gas concentrations that are present in the first environment A1, but at a lower pressure P2.

Figure 15:
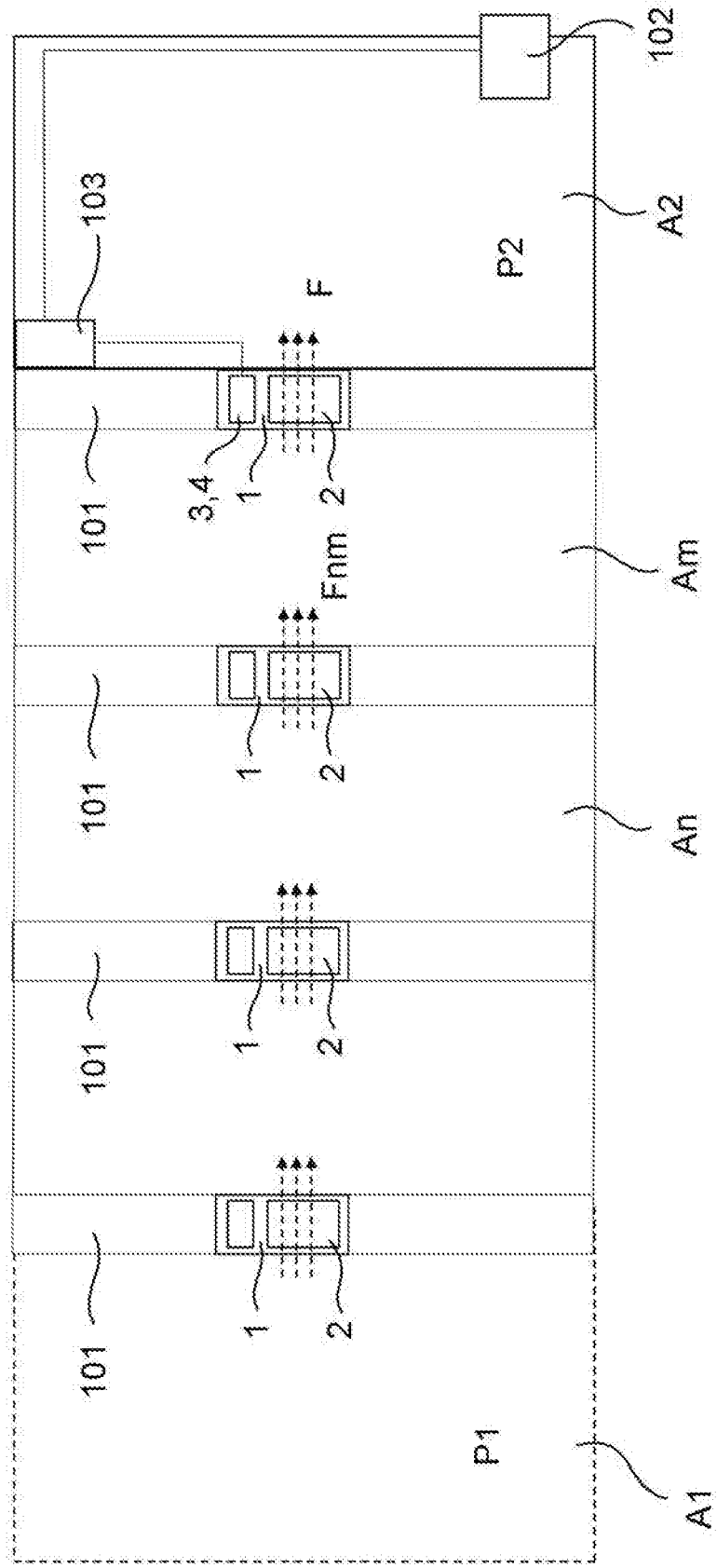
FIG. 15 shows a further embodiment of the system of FIG. 14.

According to an embodiment of the system (illustrated in FIG. 15), it comprises a plurality of flow control devices 1 and a corresponding plurality of separation structures 101 so as to define a plurality of intermediate environments An, Am between the first environment A1 and the second environment A2, at progressively decreasing pressures ranging from the pressure value of the first environment P1 to the pressure value of the second environment P2, wherein the gaseous flow Fnm between two consecutive intermediate environments is at a molecular or predominantly molecular regime, so that the gas concentrations that are present in each of the intermediate environments are the same gas concentrations that are present in the first environment A1.

According to a typical application example, the first pressure P1 is equal to, or higher than, atmospheric pressure, and the second pressure P2 is a vacuum pressure.

Wth reference now to FIG. 16, a system 200 for controlling a pressure gradient between a first environment A1 and a second environment A2 is described.

The system 200 comprises at least one device for controlling a gaseous flow 1, according to the embodiment previously described, wherein two pressure sensors 50 are present on both sides of the adjusting interface 2.

The system 200 also comprises a separation structure 101 between the first environment A1 and second environment A2, suitable to house the at least one device 1 for controlling a gaseous flow, so that a fluid communication between the first A1 and the second A2 environments is possible only by a gaseous flow F, through the adjusting interface 2 of the at least one device 1 for controlling a gaseous flow.

The control means 3, 4 of the at least one device for controlling a gaseous flow 1 are configured to control the gaseous flow through the adjusting interface 2 based on the pressure values measured by the pressure sensors 50, relating respectively to the first A1 and the second A2 environments, so as to obtain a desired pressure gradient between the first A1 and the second A2 environments.

It should be noted that, in the system 200, the device 1 is used as pressure gradient controller, or as a controller of one of the two pressures P1 or P2, when the other one is constant.

Below, methods included in the invention will be describe.

The invention comprises a method for controlling a gaseous flow, with a resolution corresponding to micro-flows, comprising the steps of: inhibiting or allowing in a controlled manner a gaseous flow to pass through a gaseous flow adjusting interface 2, comprising a plurality of nano-holes 20 having sub-micrometer dimensions, wherein each of the nano-holes is suitable to be opened or closed, so as to inhibit or allow the passage of a corresponding micro-flow.

The above-mentioned inhibiting or allowing step comprises controlling the opening or closure of each of the nano-holes 20, individually or collectively, so that the overall gaseous flow passing through the adjusting interface is the sum of the micro-flows passing through the open nano-holes.

The invention also comprises a method for measuring a gaseous flow, with a resolution corresponding to micro-flows, comprising the steps of: inhibiting or allowing in a controlled manner the passage of the gaseous flow through a gaseous flow adjusting interface 2, comprising a plurality of nano-holes 20 having sub-micrometer dimensions, that can be opened and closed, wherein each of the nano-holes is suitable to be opened or closed, so as to inhibit or allow the passage of a corresponding micro-flow and to generate an output gaseous flow corresponding to the sum of the micro-flows passing through the open nano-holes; then, measuring said output gaseous flow.

The invention also comprises a method for sampling a gas between a first environment A1 and a second environment A2, at a lower pressure than that of the first environment, comprising the steps of: separating the first environment A1 and the second environment A2 by a separation structure 101, in which at least one device for controlling a gaseous flow 1, according to any of the embodiments previously described, is housed; then, allowing a fluid communication between the first A1 and the second A2 environments exclusively through a gaseous flow, through the adjusting interface 2 of the device for controlling a gaseous flow 1; then, extracting gas from the second environment A2, so as to keep a desired constant pressure P2 in the second environment A2; finally, controlling the gaseous flow through the adjusting interface 2 and controlling the gas extraction from the second environment A2, so as to reproduce in the second environment A2 the same gas concentrations present in the first environment A1, but at a lower pressure P2.

The invention also comprises a method for controlling the pressure gradient present between a first environment A1 and a second environment A2, comprising the steps of: separating the first environment A1 and the second environment A2 with a separation structure 101, wherein at least one device for controlling a gaseous flow 1, according to the embodiment previously described, is housed, and wherein two pressure sensors 50 are present at the two sides of the adjusting interface 2. The method then comprises the step of controlling the gaseous flow through the adjusting interface 2 based on the pressure values measured by the pressure sensors 50, relating respectively to the first and the second environments, so as to obtain a desired pressure gradient between the first A1 and the second A2 environments.

As can be seen, the purpose of this invention is achieved by the device described previously, by virtue of the characteristics illustrated.

From the above description, it is apparent that the device of this invention is able to manage, adjust and control gaseous flows with an accuracy and granularity equal to micro-flows at molecular, or predominantly molecular, regime even at non-vacuum pressures and, in particular, at atmospheric, or higher, pressure.

In fact, thanks to the sub-micrometric dimensions of the nano-holes of the adjusting interface, the total flow through this interface is the sum of micro-flows, each of which is a micro-flow at molecular, or predominantly molecular, regime. Moreover, thanks to the actuation means of the device, each nano-hole can be individually controlled, and even, in some embodiments, independently with respect to all the other nano-holes. Thus, many degrees of freedom are available for controlling the overall flow, including opening/closing any combination of nano-holes and/or cycle of opening/closing each nano-hole, advantageously offering ample possibilities to implement different control strategies.

In addition, the functionality of the device ensures a continuous cleaning of the nano-holes, preventing obstructions even in contexts of use in industrial environments and/or process with pollutants.

Similar advantages can be identified in systems for sampling gas, controlling and measuring flows and controlling pressure gradients and related methods, according to the invention, in which the above-mentioned device is used.

It should also be noted that the device can be realized in miniaturized form, and even integrated into a single chip, with obvious advantages of portability and flexibility, and ease of use.

The device can also be configured to be self-sufficient in terms of calibration and self-diagnostics.

To the embodiments of the device for controlling a gaseous flow described above (and the above-mentioned systems and methods in which it is used) a technician in the field, to satisfy contingent requirements, may make modifications, adaptations and replacements of members with others functionally equivalent, without departing from the scope of the following claims. Each of the characteristics described as belonging to a possible form of embodiment can be achieved independently from the other embodiments described. Also note that the term "comprising" does not exclude other elements or steps and the "a" or "one" does not exclude a plurality. Moreover, the figures are not necessarily to scale; on the contrary, importance is generally given to the illustration of the principles of this invention.

The invention claimed is:

1. A device for controlling a gaseous flow, comprising:
a gaseous flow adjusting interface, configured to inhibit or allow a gaseous flow through the device in a controlled manner, and
adjusting interface control means;
wherein the adjusting interface comprises a plurality of nano-holes, each of the nano-holes having sub-micro-metric dimensions and being suitable to be opened or closed, in a controlled manner;
and wherein the control means comprise:
actuating means, suitable to open or close said nano-holes, wherein the actuating means comprises mechanical members each at least partially insertable into a corresponding nano-hole, and
electronic processing means, configured to activate the actuating means to individually or collectively open or close said nano-holes in a controlled manner.

2. The device according to claim 1, wherein each of the nano-holes is configured to allow a gaseous micro-flow at a molecular or predominantly molecular regime, even in conditions of atmospheric pressure or above, when it is open, and to inhibit said gaseous micro-flow, when it is closed, so that an overall gaseous flow passing through the adjusting interface is the sum of the micro-flows at a molecular or predominantly molecular regime passing through the open nano-holes.

3. The device according to claim 1, wherein said device is an integrated device.

4. The device according to claim 3, wherein the adjusting interface and the control means are comprised in a single miniaturized chip of the integrated device.

5. The device according to claim 1, wherein the processing means are configured to control the actuating means, so that each nano-hole can be opened or closed individually and in an independent manner with respect to the other nano-holes.

6. The device according to claim 1, wherein each nano-hole has a defined geometry and a deterministically measureable conductance, and wherein each nano-hole has a diameter comprised in the range from 10 to 100 nm.

7. The device according to claim 1, wherein the adjusting interface comprises one or more flow control windows, each window comprising a membrane, through which the nano-holes are obtained, wherein the nano-holes are arranged according to a two-dimensional array in rows and columns, and wherein the number of nano-holes is in the order of hundreds.

8. The device according to claim 1, wherein the mechanical members comprise a plurality of miniaturized nano-hole opening/closing members, each of said members being suitable to open or close the corresponding nano-hole, so as to maximize or minimize, respectively, a respective nano-hole conductance.

9. The device according to claim 8, wherein each miniaturized opening/closing member comprises a plug electro-mechanically actuatable to close or open the corresponding nano-hole, by an axial movement with respect to the nano-hole, and wherein said plug comprises:
a base, having larger dimensions than the nano-hole, so as to completely obstruct an outlet of the nano-hole, on a side of the adjusting interface at which the plug is located, upon the closure movement;
a tip, which is integral to the base, suitable to penetrate the nano-hole, upon the closure movement, or wherein each miniaturized opening/closing member comprises:
a cylinder, having a diameter substantially equal to that of the corresponding nano-hole, the cylinder being electro-magnetically actuatable to be inserted into or extracted from the corresponding nano-hole, by an axial movement with respect to the nano-hole;
a plurality of solenoids, each solenoid being associated to a corresponding nano-hole and a corresponding cylinder, and coaxial thereto;
and wherein each cylinder comprises parts made of a ferromagnetic or paramagnetic material, so as to be sensitive to a magnetic field generated by the solenoids and to move as a function of said magnetic field, or wherein each opening/closing member comprises a micro-cantilever, having, at an oscillating end, a substantially conical micro-tip, suitable to be inserted into or extracted from the nano-hole, said micro-cantilever being electro-mechanically actuatable so as to oscillate between a closure position, in which the micro-tip enters the nano-hole to close it, and an opening position, in which the micro-tip exits the nano-hole to open it, or wherein the actuating means comprise a multiple opening/closure oscillating planar member, configured to concurrently open/close all the nano-holes of the adjusting interface, and the single miniaturized nano-hole opening/closing members are arranged on one side of the planar member in a configuration corresponding to that of the nano-holes, so that each miniaturized opening/closing member is simultaneously inserted into or extracted from the corresponding nano-hole, upon a corresponding movement of the planar member.

10. The device according to claim 8, wherein the actuating means are arranged on one side of the adjusting interface, and are configured to open/close the opening of each nano-hole corresponding to said side, or they are arranged on both sides of the adjusting interface, and are configured to open/close both openings of each nano-hole corresponding to both sides of the adjusting interface, and wherein the miniaturized opening/closing members are further configured to clean and clear each nano-hole of possible obstructions, upon each operative event of closure and subsequent opening or upon specific anti-obstruction closure/opening events.

11. The device according to claim 1, wherein the electronic processing means comprise:
a processor, operatively electrically connected to the actuating means, so as to control them by sending electric signals;

a buffer, operatively connected to the processor to receive opening/closure control signals relating to a plurality of nano-holes;

a driving member, operatively connected to the buffer to sequentially receive said opening/closure control signals, and configured to sequentially generate corresponding opening/closure driving signals relating to a plurality of nano-holes;

a multiplexer, operatively connected to the driving member to receive in succession said opening/closure driving signals and configured to direct each opening/closure driving signal to a corresponding nano-hole of said plurality of nano-holes.

12. The device according to claim 1, wherein the control means are configured to control the gaseous flow passing through the adjusting interface, with a precision and a granularity corresponding to micro-flows passing through the nano-holes, by determining a pattern of open and closed nano-holes, in terms of a number and position of open and closed nano-holes, or by determining the relationship between the opening time and closure time of the nano-holes, or an operative cycle.

13. The device according to claim 1, comprising a sealing support, incorporating the adjusting interface, configured so that the only flow possible between the two opposite sides of said support, suitable to face environments having different pressures, is the controlled flow through the adjusting interface, and further comprising, on opposite sides with respect to said sealing support, two corresponding miniaturized pressure sensors, configured to measure a corresponding pressure value and to provide the measured pressure values to the processing means.

14. A system for gas sampling between a first environment (A1), at a first pressure (P1), and a second environment (A2), at a second pressure (P2) lower than the first pressure (P1), comprising:

at least one device for controlling a gaseous flow, according to claim 1;

at least one separation structure between said first environment (A1) and second environment (A2), suitable to house the corresponding at least one device for controlling a gaseous flow, so that a fluid communication between the first (A1) and the second (A2) environments is possible only through a gaseous flow (F), through the adjusting interface of the at least one device for controlling a gaseous flow;

pumping means, configured to extract gas from the second environment (A2), so as to keep a desired constant pressure (P2) in said second environment;

system control means, operatively connected to the control means of the at least one device for controlling a gaseous flow and to the pumping means, and configured to control the at least one device for controlling a gaseous flow and the pumping means, so as to reproduce in the second environment (A2) the same gas concentrations that are present in the first environment (A1), but at a lower pressure (P2).

15. The system according to claim 14, comprising a plurality of devices and a corresponding plurality of separation structures so as to define a plurality of intermediate environments (An, Am) between the first environment (A1) and the second environment (A2), at progressively decreasing pressures ranging from the pressure value of the first environment (P1) to the pressure value of the second environment (P2), wherein the gaseous flow (Fnm) between two consecutive intermediate environments is at a molecular or predominantly molecular regime, so that the gas concentrations that are present in each of the intermediate environments are the same gas concentrations that are present in the first environment (A1).

16. A system for controlling the baric gradient that is present between a first environment (A1) and a second environment (A2), comprising:

at least one device for controlling a gaseous flow, according to claim 13;

a separation structure between said first environment (A1) and second environment (A2), suitable to house the at least one device for controlling a gaseous flow, so that a fluid communication between the first (A1) and the second (A2) environments is possible only by a gaseous flow (F), through the adjusting interface of the at least one device for controlling a gaseous flow;

wherein the control means of the at least one device for controlling a gaseous flow are configured to control the gaseous flow through said adjusting interface based on the pressure values measured by the pressure sensors that are present at the two sides of the adjusting interface, relating respectively to the first (A1) and the second (A2) environments, so as to obtain a desired baric gradient between the first (A1) and the second (A2) environments.

* * * * *